(12) United States Patent
Fakoorian et al.

(10) Patent No.: US 11,540,310 B2
(45) Date of Patent: Dec. 27, 2022

(54) GROUP SCHEDULING APPLICATIONS

(71) Applicant: QUALCOMM Incorporated, San Diego, CA (US)

(72) Inventors: Seyed Ali Akbar Fakoorian, San Diego, CA (US); Aleksandar Damnjanovic, Del Mar, CA (US); Tao Luo, San Diego, CA (US); Xiaoxia Zhang, San Diego, CA (US); Yan Zhou, San Diego, CA (US); Jing Sun, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 189 days.

(21) Appl. No.: 16/985,946

(22) Filed: Aug. 5, 2020

(65) Prior Publication Data
US 2021/0051701 A1 Feb. 18, 2021

Related U.S. Application Data

(60) Provisional application No. 62/885,592, filed on Aug. 12, 2019.

(51) Int. Cl.
*H04W 72/12* (2009.01)
*H04L 1/18* (2006.01)
(Continued)

(52) U.S. Cl.
CPC ....... *H04W 72/1294* (2013.01); *H04L 1/1812* (2013.01); *H04W 72/042* (2013.01); *H04W 72/14* (2013.01)

(58) Field of Classification Search
CPC ....... H04L 1/08; H04L 1/1812; H04L 1/1822; H04L 1/1896; H04W 72/042;
(Continued)

(56) References Cited

U.S. PATENT DOCUMENTS 10,439,786 B2 * 10/2019 Luo ................ H04L 1/0045
10,575,299 B2 * 2/2020 Ying ................ H04W 72/044
(Continued)

FOREIGN PATENT DOCUMENTS

BR 112019020901 A2 * 4/2020 ........... H04L 5/0053
CN 109587795 A * 4/2019 ............... H04L 5/00
(Continued)

OTHER PUBLICATIONS

International Search Report and Written Opinion—PCT/US2020/045200—ISA/EPO—Oct. 16, 2020.
(Continued)

*Primary Examiner* — Eric Nowlin
(74) *Attorney, Agent, or Firm* — Kevin T. Cheatham

(57) ABSTRACT

Methods, systems, and devices for wireless communications are described. A communication device, which may be otherwise known as a user equipment may receive control signaling that configures the communication device with a set of configured grant configurations. The communication device may receive, via a group control channel, group downlink control information (DCI) for a plurality of communication devices that includes the communication device. In some examples, the group control channel may be a group physical downlink control channel. The communication device may communicate a data transmission in accordance with a first configured grant configuration of the plurality of configured grant configurations based on a configuration indication in the group DCI indicating the first configured grant configuration.

26 Claims, 22 Drawing Sheets

(51) Int. Cl.
*H04W 72/04* (2009.01)
*H04W 72/14* (2009.01)

(58) Field of Classification Search
CPC .......... H04W 72/121; H04W 72/1289; H04W 72/1294; H04W 72/14
See application file for complete search history.

(56) References Cited

U.S. PATENT DOCUMENTS

| | | | |
|---|---|---|---|
| 10,595,326 B2* | 3/2020 | Liao | H04L 5/0007 |
| 10,645,730 B2* | 5/2020 | Cao | H04W 76/27 |
| 10,757,581 B2* | 8/2020 | Hwang | H04W 72/042 |
| 11,297,674 B2* | 4/2022 | He | H04L 41/0896 |
| 2011/0228732 A1* | 9/2011 | Luo | H04L 5/0094 370/329 |
| 2015/0131605 A1* | 5/2015 | Nogami | H04L 5/0053 370/330 |
| 2015/0319774 A1* | 11/2015 | Cai | H04W 36/0016 370/329 |
| 2015/0341867 A1* | 11/2015 | Lou | H04W 74/006 370/329 |
| 2018/0167959 A1* | 6/2018 | Liao | H04L 5/0007 |
| 2018/0279135 A1* | 9/2018 | Hwang | H04W 72/042 |
| 2018/0295651 A1* | 10/2018 | Cao | H04W 72/042 |
| 2018/0368075 A1* | 12/2018 | Chen | H04W 52/42 |
| 2019/0053211 A1* | 2/2019 | Ying | H04W 72/14 |
| 2019/0132862 A1 | 5/2019 | Jeon et al. | |
| 2019/0215862 A1* | 7/2019 | Kim | H04W 74/006 |
| 2020/0107301 A1 | 4/2020 | Chen et al. | |
| 2020/0213036 A1* | 7/2020 | Shen | H04L 5/0044 |
| 2020/0245376 A1* | 7/2020 | Cao | H04W 72/14 |
| 2020/0275413 A1* | 8/2020 | Zhang | H04W 72/048 |
| 2020/0313807 A1* | 10/2020 | Salem | H04W 72/14 |
| 2020/0359409 A1* | 11/2020 | Karaki | H04W 72/1268 |
| 2020/0396767 A1* | 12/2020 | Talarico | H04W 74/0808 |
| 2021/0037561 A1* | 2/2021 | Lyu | H04W 72/042 |
| 2021/0160879 A1* | 5/2021 | Lin | H04L 1/1896 |
| 2021/0314942 A1* | 10/2021 | Liu | H04W 72/0446 |
| 2021/0314982 A1* | 10/2021 | Panteleev | H04L 5/0044 |
| 2022/0015135 A1* | 1/2022 | Yang | H04L 5/0091 |
| 2022/0069950 A1* | 3/2022 | Nunome | H04L 5/0064 |

FOREIGN PATENT DOCUMENTS

| | | | | |
|---|---|---|---|---|
| CN | 110419251 A | * | 11/2019 | ........... H04L 5/0053 |
| CN | 110784935 A | * | 2/2020 | ........... H04L 5/0053 |
| CN | 109587795 B | * | 10/2020 | ............... H04L 5/00 |
| CN | 112544051 A | * | 3/2021 | ............... H04L 1/08 |
| CN | 113228767 A | * | 8/2021 | ............ H04W 36/06 |
| CN | 110419251 B | * | 1/2022 | ........... H04L 5/0053 |
| CN | 114026943 A | * | 2/2022 | ......... H04L 27/2626 |
| EP | 3603272 B1 | * | 1/2022 | ........... H04L 5/0053 |
| EP | 4007431 A1 | * | 6/2022 | ........... H04L 5/0053 |
| JP | 2020513177 A | * | 4/2020 | |
| KR | 102264620 B1 | * | 6/2021 | |
| WO | WO-2018184440 A1 | * | 10/2018 | ........... H04L 5/0053 |
| WO | WO-2019062851 A1 | | 4/2019 | |
| WO | WO-2020033785 A1 | * | 2/2020 | ............... H04L 1/08 |
| WO | WO-2020169108 A1 | * | 8/2020 | ............ H04W 36/06 |
| WO | WO-2021018299 A1 | * | 2/2021 | ......... H04L 27/2626 |

OTHER PUBLICATIONS

Panasonic: "Discussion on URLLC Enhancements for Grant-free Transmission", 3GPP TSG RAN WG1 #97, 3GPP Draft; R1-1906868, 3rd Generation Partnership Project (3GPP). Mobile Competence Centre; 650, Route Des Lucioles; F-06921 Sophia-Antipolis Cedex; France vol. RAN WG1, No. Reno. USA; May 13-17, 2019, May 13, 2019 (May 13, 2019), pp. 1-3, XP051728319, Retrieved from the Internet: URL: http://www.3gpp.org/ftp/Meetings%5F3GPP%5FSYNC/RAN1/Docs/R1%2D1906868%2Ezip [retrieved on May 13, 2019] Section 1, Section 2.

* cited by examiner

GROUP SCHEDULING APPLICATIONS

CROSS REFERENCE

The present application for patent claims the benefit of U.S. Provisional Patent Application No. 62/885,592 by Fakoorian et al., entitled "GROUP SCHEDULING APPLICATIONS," filed Aug. 12, 2019, assigned to the assignee hereof, and expressly incorporated by reference in its entirety herein.

FIELD OF TECHNOLOGY

The following relates generally to wireless communications and more specifically to group scheduling applications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices which may be otherwise known as user equipments (UEs). Some wireless communications systems may support high reliability and low latency communications, for example, such as ultra-reliable low-latency communications (URLLC) (e.g., in industrial automation) or Internet of Things (IoT) communications. Some wireless communications systems may support scheduling groups of communication devices via uplink grant-free configurations or downlink semi-persistent scheduling configurations, for example, to support the high-reliability and low-latency communications. As demand for communication efficiency increases, some wireless communications systems may fail to provide satisfactory time and frequency resource allocation related to scheduling the groups of communication devices, and thereby may be unable to support high-reliability and-low latency communications, among other examples. Improved techniques are therefore desired.

SUMMARY

The described techniques may relate to configuring a communication device, which may be a user equipment (UE), to support high reliability and low latency communications. For example, the communication device may support ultra-reliable low-latency communications (URLLC) or Internet of Things (IoT) communications, among other examples. In some examples, the described techniques may configure the communication device to receive control signaling, such as downlink control information (DCI) signaling, medium access control (MAC) control element (MAC-CE) signaling, radio resource control (RRC) signaling, among other examples that may configure the communication device with multiple configured grant configurations. The described techniques may, in some examples, configure the communication device to receive a group common downlink control information (GC-DCI), which may correspond to multiple communication devices.

In some examples, the communication device may receive the GC-DCI via a group control channel, for example, such as a group common physical downlink control channel (GC-PDCCH). The GC-DCI may, in some examples, carry a configuration indication relating to a configured grant configuration for the communication device to use from the multiple configured grant configurations. The described techniques may therefore configure communication devices to support high reliability and low latency communications, among other examples, in accordance with a configured grant configuration based on the configuration indication in the GC-DCI. The described techniques may thus include features for improvements to power consumption, spectral efficiency, higher data rates and, in some examples, may promote enhanced efficiency for high-reliability and low-latency operations, among other benefits.

A method of wireless communications by a UE is described. The method may include receiving control signaling that configures the UE with a set of configured grant configurations, receiving, via a group control channel, group DCI for a set of UEs that includes the UE, and communicating a data transmission in accordance with a first configured grant configuration of the set of configured grant configurations based on a configuration indication in the group DCI indicating the first configured grant configuration.

An apparatus for wireless communications is described. The apparatus may include a processor, memory coupled with the processor, and instructions stored in the memory. The instructions may be executable by the processor to cause the apparatus to receive control signaling that configures the apparatus with a set of configured grant configurations, receive, via a group control channel, group DCI for a set of apparatuses that includes the apparatus, and communicate a data transmission in accordance with a first configured grant configuration of the set of configured grant configurations based on a configuration indication in the group DCI indicating the first configured grant configuration.

Another apparatus for wireless communications is described. The apparatus may include means for receiving control signaling that configures the apparatus with a set of configured grant configurations, receiving, via a group control channel, group DCI for a set of apparatuses that includes the apparatus, and communicating a data transmission in accordance with a first configured grant configuration of the set of configured grant configurations based on a configuration indication in the group DCI indicating the first configured grant configuration.

A non-transitory computer-readable medium storing code for wireless communications by a UE is described. The code may include instructions executable by a processor to receive control signaling that configures the apparatus with a set of configured grant configurations, receive, via a group control channel, group DCI for a set of apparatuses that includes the apparatus, and communicate a data transmission in accordance with a first configured grant configuration of the set of configured grant configurations based on a configuration indication in the group DCI indicating the first configured grant configuration.

In some examples of the method, apparatuses, and non-transitory computer-readable medium described herein, receiving the control signaling may include operations, features, means, or instructions for receiving the control signaling that indicates a group identifier assigned to the set of UEs, where the group DCI may be received based on the group identifier.

In some examples of the method, apparatuses, and non-transitory computer-readable medium described herein, receiving the control signaling may include operations, features, means, or instructions for receiving the control signaling that indicates a payload size for the group DCI, where the group DCI may be received based on the payload size.

In some examples of the method, apparatuses, and non-transitory computer-readable medium described herein, receiving the control signaling may include operations, features, means, or instructions for receiving the control signaling that indicates a serving cell identifier, where the data transmission may be communicated on a carrier corresponding to the serving cell identifier.

In some examples of the method, apparatuses, and non-transitory computer-readable medium described herein, receiving the control signaling may include operations, features, means, or instructions for receiving the control signaling that indicates a starting position indicator, where the configuration indication may be identified for the UE within the group DCI based on the starting position indicator.

Some examples of the method, apparatuses, and non-transitory computer-readable medium described herein may further include operations, features, means, or instructions for decoding the group DCI corresponding to the starting position indicator to obtain at least one parameter, where the data transmission may be transmitted based on the at least one parameter.

In some examples of the method, apparatuses, and non-transitory computer-readable medium described herein, the configuration indication includes an index corresponding to the first configured grant configuration.

In some examples of the method, apparatuses, and non-transitory computer-readable medium described herein, receiving the control signaling may include operations, features, means, or instructions for receiving the control signaling that indicates a transmit power control command, where the data transmission may be transmitted based on the transmit power control command.

In some examples of the method, apparatuses, and non-transitory computer-readable medium described herein, receiving the control signaling may include operations, features, means, or instructions for receiving the control signaling that indicates a transmit power control command and the configuration indication includes an index corresponding to the first configured grant configuration.

Some examples of the method, apparatuses, and non-transitory computer-readable medium described herein may further include operations, features, means, or instructions for identifying that a first configured grant activated by the first configured grant configuration may be for an initial transmission or a retransmission.

In some examples of the method, apparatuses, and non-transitory computer-readable medium described herein, the identifying may include operations, features, means, or instructions for identifying that the first configured grant activated by the first configured grant configuration may be for the initial transmission based on acknowledging a preceding transmission.

In some examples of the method, apparatuses, and non-transitory computer-readable medium described herein, the identifying may include operations, features, means, or instructions for identifying that the first configured grant activated by the first configured grant configuration may be for the retransmission based on negatively acknowledging a preceding transmission.

In some examples of the method, apparatuses, and non-transitory computer-readable medium described herein, receiving the group DCI may include operations, features, means, or instructions for receiving the group DCI that includes a status indication that indicates that a first configured grant activated by the first configured grant configuration may be for an initial transmission or a retransmission.

Some examples of the method, apparatuses, and non-transitory computer-readable medium described herein may further include operations, features, means, or instructions for releasing a first dynamic grant or a first configured grant corresponding to the first configured grant configuration based on the data transmission being a retransmission.

Some examples of the method, apparatuses, and non-transitory computer-readable medium described herein may further include operations, features, means, or instructions for determining a feedback identifier corresponding to the data transmission that may be a retransmission.

In some examples of the method, apparatuses, and non-transitory computer-readable medium described herein, the feedback identifier may be determined based on a prior feedback identifier.

In some examples of the method, apparatuses, and non-transitory computer-readable medium described herein, the feedback identifier may be determined based on a feedback identifier field in DCI for the UE within the group DCI.

In some examples of the method, apparatuses, and non-transitory computer-readable medium described herein, the feedback identifier may be a hybrid automatic repeat request (HARQ) identifier.

Some examples of the method, apparatuses, and non-transitory computer-readable medium described herein may further include operations, features, means, or instructions for starting a timer for the feedback identifier corresponding to the data transmission that may be the retransmission.

In some examples of the method, apparatuses, and non-transitory computer-readable medium described herein, a first configured grant corresponding to the first configured grant configuration remains active for one or more additional initial data transmissions until a release indicator may be received.

In some examples of the method, apparatuses, and non-transitory computer-readable medium described herein, the group DCI indicates to release a first configured grant corresponding to the first configured grant configuration subsequent to communicating the data transmission.

In some examples of the method, apparatuses, and non-transitory computer-readable medium described herein, the group DCI activates a semi-persistent resource or an uplink configured grant resource for a single initial transmission.

In some examples of the method, apparatuses, and non-transitory computer-readable medium described herein, a HARQ field of the group DCI indicates a HARQ process that may be scheduled.

Some examples of the method, apparatuses, and non-transitory computer-readable medium described herein may further include operations, features, means, or instructions for receiving control signaling that indicates the group DCI includes a HARQ field, and determining that the group DCI activates a semi-persistent resource or an uplink configured grant resource for a single initial transmission based on the control signaling indicating that the group DCI includes the HARQ field.

Some examples of the method, apparatuses, and non-transitory computer-readable medium described herein may further include operations, features, means, or instructions for receiving control signaling that indicates the group DCI does not include a HARQ field, and determining that the group DCI activates a semi-persistent resource or an uplink configured grant resource for multiple transmissions based on the control signaling indicating that the group DCI does not include the HARQ field.

Some examples of the method, apparatuses, and non-transitory computer-readable medium described herein may further include operations, features, means, or instructions for receiving unicast DCI that deactivates a first configured grant corresponding to the first configured grant configuration subsequent to communicating the data transmission.

Some examples of the method, apparatuses, and non-transitory computer-readable medium described herein may further include operations, features, means, or instructions for receiving second group DCI that activates the first configured grant corresponding to the first configured grant configuration subsequent to receiving the unicast DCI.

Some examples of the method, apparatuses, and non-transitory computer-readable medium described herein may further include operations, features, means, or instructions for receiving second group DCI that releases a first configured grant corresponding to the first configured grant configuration subsequent to communicating the data transmission.

Some examples of the method, apparatuses, and non-transitory computer-readable medium described herein may further include operations, features, means, or instructions for receiving unicast DCI that activates the first configured grant corresponding to the first configured grant configuration subsequent to receiving the unicast DCI.

Some examples of the method, apparatuses, and non-transitory computer-readable medium described herein may further include operations, features, means, or instructions for receiving second group DCI that releases a semi-persistent resource corresponding to the first configured grant configuration, and transmitting an acknowledgement for the second group DCI in a resource of the group control channel that may be RRC configured for the UE or indicated by UE-specific DCI within the second group DCI.

Some examples of the method, apparatuses, and non-transitory computer-readable medium described herein may further include operations, features, means, or instructions for receiving RRC signaling that indicates, for the UE, a first delay between reception of a downlink grant and a downlink data reception corresponding to the downlink grant, a second delay between the data reception and feedback transmission for the data reception, a third delay between reception of an uplink grant and an uplink data transmission corresponding to the uplink grant, or any combination thereof.

Some examples of the method, apparatuses, and non-transitory computer-readable medium described herein may further include operations, features, means, or instructions for receiving DCI including a per UE bit field that indicates a first delay between reception of a downlink grant and a downlink data reception corresponding to the downlink grant, a second delay between the data reception and feedback transmission for the data reception, a third delay between reception of an uplink grant and an uplink data transmission corresponding to the uplink grant, or any combination thereof.

Some examples of the method, apparatuses, and non-transitory computer-readable medium described herein for receiving the group DCI may further include operations, features, means, or instructions for receiving the group DCI that includes an indication for the plurality of UEs indicating a first delay between reception of a downlink grant and a downlink data reception corresponding to the downlink grant, a second delay between the data reception and feedback transmission for the data reception, a third delay between reception of an uplink grant and an uplink data transmission corresponding to the uplink grant, or any combination thereof.

Some examples of the method, apparatuses, and non-transitory computer-readable medium described herein may further include operations, features, means, or instructions for receiving RRC signaling that indicates a resource of a control channel for feedback transmission by the UE.

Some examples of the method, apparatuses, and non-transitory computer-readable medium described herein may further include operations, features, means, or instructions for receiving a bit-map in DCI that indicates which resource of a plurality of different resources from a control channel the UE is to use for feedback transmission.

Some examples of the method, apparatuses, and non-transitory computer-readable medium described herein may further include operations, features, means, or instructions for receiving RRC signaling that indicates the plurality of different resources.

Some examples of the method, apparatuses, and non-transitory computer-readable medium described herein may further include operations, features, means, or instructions for receiving a control message that indicates a subset of the plurality of different resources, where the DCI indicates which resource from the subset of the plurality of different resources the UE is to use for feedback transmission.

Some examples of the method, apparatuses, and non-transitory computer-readable medium described herein may further include operations, features, means, or instructions for receiving unicast DCI that includes a first grant, the unicast DCI at least partially overlapping in time with the group DCI that includes a second grant, where the data transmission may be communicated in accordance with the first grant based on a number of symbols between a last symbol of a control channel that transports the unicast DCI and a first symbol indicated in the first grant or the second grant satisfies a threshold.

Some examples of the method, apparatuses, and non-transitory computer-readable medium described herein may further include operations, features, means, or instructions for receiving unicast DCI that includes a first grant, the unicast DCI at least partially overlapping in time with the group DCI that includes a second grant, where the data transmission may be communicated in accordance with the first grant based on a last symbol of the group control channel that transports the group DCI ending after a last symbol of a second control channel that transports the unicast DCI.

Some examples of the method, apparatuses, and non-transitory computer-readable medium described herein may further include operations, features, means, or instructions for receiving unicast DCI that includes a first grant, the unicast DCI at least partially overlapping in time with the group DCI that includes a second grant, and identifying an error based on a number of symbols between a last symbol of a control channel that transports the unicast DCI and a first symbol indicated in the first grant, or the second grant not satisfying a threshold or based on a last symbol of the group control channel that transports the group DCI not ending after a last symbol of a second control channel that transports the unicast DCI, or both.

A method of wireless communications by a base station is described. The method may include transmitting control signaling that configures a UE with a set of configured grant configurations, transmitting, via a group control channel, group DCI for a set of UEs that includes the UE, and communicating, to the UE, a data transmission in accordance with a first configured grant configuration of the set of configured grant configurations based on a configuration indication for the UE in the group DCI indicating the first configured grant configuration.

An apparatus for wireless communications is described. The apparatus may include a processor, memory coupled with the processor, and instructions stored in the memory. The instructions may be executable by the processor to cause the apparatus to transmit control signaling that configures a UE with a set of configured grant configurations, transmit, via a group control channel, group DCI for a set of UEs that includes the UE, and communicate, to the UE, a data transmission in accordance with a first configured grant configuration of the set of configured grant configurations based on a configuration indication for the UE in the group DCI indicating the first configured grant configuration.

Another apparatus for wireless communications is described. The apparatus may include means for transmitting control signaling that configures a UE with a set of configured grant configurations, transmitting, via a group control channel, group DCI for a set of UEs that includes the UE, and communicating, to the UE, a data transmission in accordance with a first configured grant configuration of the set of configured grant configurations based on a configuration indication for the UE in the group DCI indicating the first configured grant configuration.

A non-transitory computer-readable medium storing code for wireless communications by a base station is described. The code may include instructions executable by a processor to transmit control signaling that configures a UE with a set of configured grant configurations, transmit, via a group control channel, group DCI for a set of UEs that includes the UE, and communicate, to the UE, a data transmission in accordance with a first configured grant configuration of the set of configured grant configurations based on a configuration indication for the UE in the group DCI indicating the first configured grant configuration.

In some examples of the method, apparatuses, and non-transitory computer-readable medium described herein, transmitting the control signaling may include operations, features, means, or instructions for transmitting the control signaling that indicates a group identifier assigned to the set of UEs, where the group DCI may be transmitted based on the group identifier.

In some examples of the method, apparatuses, and non-transitory computer-readable medium described herein, transmitting the control signaling may include operations, features, means, or instructions for transmitting the control signaling that indicates a payload size for the group DCI, where the group DCI may be transmitted based on the payload size.

In some examples of the method, apparatuses, and non-transitory computer-readable medium described herein, transmitting the control signaling may include operations, features, means, or instructions for transmitting one or more of a group identifier assigned to the plurality of UEs, or a payload size for the group downlink control information, wherein the group downlink control information is transmitted based at least in part on the control signaling.

In some examples of the method, apparatuses, and non-transitory computer-readable medium described herein, transmitting the control signaling may include operations, features, means, or instructions for transmitting the control signaling that indicates a serving cell identifier, where the data transmission may be communicated on a carrier corresponding to the serving cell identifier.

In some examples of the method, apparatuses, and non-transitory computer-readable medium described herein, transmitting the control signaling may include operations, features, means, or instructions for transmitting the control signaling that indicates a starting position indicator, where the configuration indication may be identified for the UE within the group DCI based on the starting position indicator.

In some examples of the method, apparatuses, and non-transitory computer-readable medium described herein, the configuration indication includes an index corresponding to the first configured grant configuration.

In some examples of the method, apparatuses, and non-transitory computer-readable medium described herein, transmitting the control signaling may include operations, features, means, or instructions for transmitting the control signaling that indicates a transmit power control command, where the data transmission may be communicated based on the transmit power control command.

In some examples of the method, apparatuses, and non-transitory computer-readable medium described herein, transmitting the control signaling may include operations, features, means, or instructions for transmitting the control signaling that indicates a transmit power control command and the configuration indication includes an index corresponding to the first configured grant configuration.

Some examples of the method, apparatuses, and non-transitory computer-readable medium described herein may further include operations, features, means, or instructions for identifying that a first configured grant activated by the first configured grant configuration may be for an initial transmission or a retransmission.

In some examples of the method, apparatuses, and non-transitory computer-readable medium described herein, the identifying may include operations, features, means, or instructions for identifying that the first configured grant activated by the first configured grant configuration may be for the initial transmission based on receiving an acknowledgement for a preceding transmission.

In some examples of the method, apparatuses, and non-transitory computer-readable medium described herein, the identifying may include operations, features, means, or instructions for identifying that the first configured grant activated by the first configured grant configuration may be for the retransmission based on receiving a negative acknowledgement for a preceding transmission.

In some examples of the method, apparatuses, and non-transitory computer-readable medium described herein, transmitting the group DCI may include operations, features, means, or instructions for transmitting the group DCI that includes a status indication that indicates that a first configured grant activated by the first configured grant configuration may be for an initial transmission or a retransmission.

Some examples of the method, apparatuses, and non-transitory computer-readable medium described herein may further include operations, features, means, or instructions for releasing a first dynamic grant or a first configured grant corresponding to the first configured grant configuration based on the data transmission being a retransmission.

Some examples of the method, apparatuses, and non-transitory computer-readable medium described herein may further include operations, features, means, or instructions for determining a feedback identifier corresponding to the data transmission that may be a retransmission.

In some examples of the method, apparatuses, and non-transitory computer-readable medium described herein, the feedback identifier may be determined based on a prior feedback identifier.

In some examples of the method, apparatuses, and non-transitory computer-readable medium described herein, the feedback identifier may be determined based on DCI for the UE within the group DCI.

Some examples of the method, apparatuses, and non-transitory computer-readable medium described herein may further include operations, features, means, or instructions for starting a timer for the feedback identifier corresponding to the data transmission that may be the retransmission.

In some examples of the method, apparatuses, and non-transitory computer-readable medium described herein, a first configured grant corresponding to the first configured grant configuration remains active for one or more additional initial data transmissions until a release indicator may be transmitted by the base station to the UE.

In some examples of the method, apparatuses, and non-transitory computer-readable medium described herein, the group DCI indicates to release a first configured grant corresponding to the first configured grant configuration subsequent to communicating the data transmission.

In some examples of the method, apparatuses, and non-transitory computer-readable medium described herein, the group DCI activates a semi-persistent resource or an uplink configured grant resource for a single initial transmission.

In some examples of the method, apparatuses, and non-transitory computer-readable medium described herein, a HARQ field of the group DCI indicates a HARQ process that may be scheduled.

Some examples of the method, apparatuses, and non-transitory computer-readable medium described herein may further include operations, features, means, or instructions for transmitting control signaling that indicates the group DCI includes a HARQ field.

Some examples of the method, apparatuses, and non-transitory computer-readable medium described herein may further include operations, features, means, or instructions for transmitting control signaling that indicates the group DCI does not include a HARQ field.

Some examples of the method, apparatuses, and non-transitory computer-readable medium described herein may further include operations, features, means, or instructions for transmitting unicast DCI that deactivates a first configured grant corresponding to the first configured grant configuration subsequent to communicating the data transmission.

Some examples of the method, apparatuses, and non-transitory computer-readable medium described herein may further include operations, features, means, or instructions for transmitting second group DCI that activates a first configured grant corresponding to the first configured grant configuration subsequent to transmitting the unicast DCI.

Some examples of the method, apparatuses, and non-transitory computer-readable medium described herein may further include operations, features, means, or instructions for transmitting second group DCI that releases a first configured grant corresponding to the first configured grant configuration subsequent to communicating the data transmission.

Some examples of the method, apparatuses, and non-transitory computer-readable medium described herein may further include operations, features, means, or instructions for transmitting unicast DCI that activates the first configured grant corresponding to the first configured grant configuration subsequent to receiving the unicast DCI.

Some examples of the method, apparatuses, and non-transitory computer-readable medium described herein may further include operations, features, means, or instructions for transmitting second group DCI that releases a semi-persistent resource corresponding to the first configured grant configuration, and receiving an acknowledgement for the second group DCI in a resource of the group control channel that may be RRC configured for the UE or indicated by UE-specific DCI within the second group DCI.

Some examples of the method, apparatuses, and non-transitory computer-readable medium described herein may further include operations, features, means, or instructions for transmitting unicast DCI that includes a first grant, the unicast DCI at least partially overlapping in time with the group DCI that includes a second grant, where the data transmission may be communicated in accordance with the first grant based on a number of symbols between a last symbol of a control channel that transports the unicast DCI and a first symbol indicated in the first grant or the second grant satisfies a threshold.

Some examples of the method, apparatuses, and non-transitory computer-readable medium described herein may further include operations, features, means, or instructions for transmitting unicast DCI that includes a first grant, the unicast DCI at least partially overlapping in time with the group DCI that includes a second grant, where the data transmission may be communicated in accordance with the first grant based on a last symbol of the group control channel that transports the group DCI ending after a last symbol of a second control channel that transports the unicast DCI.

DETAILED DESCRIPTION

Figure 1:
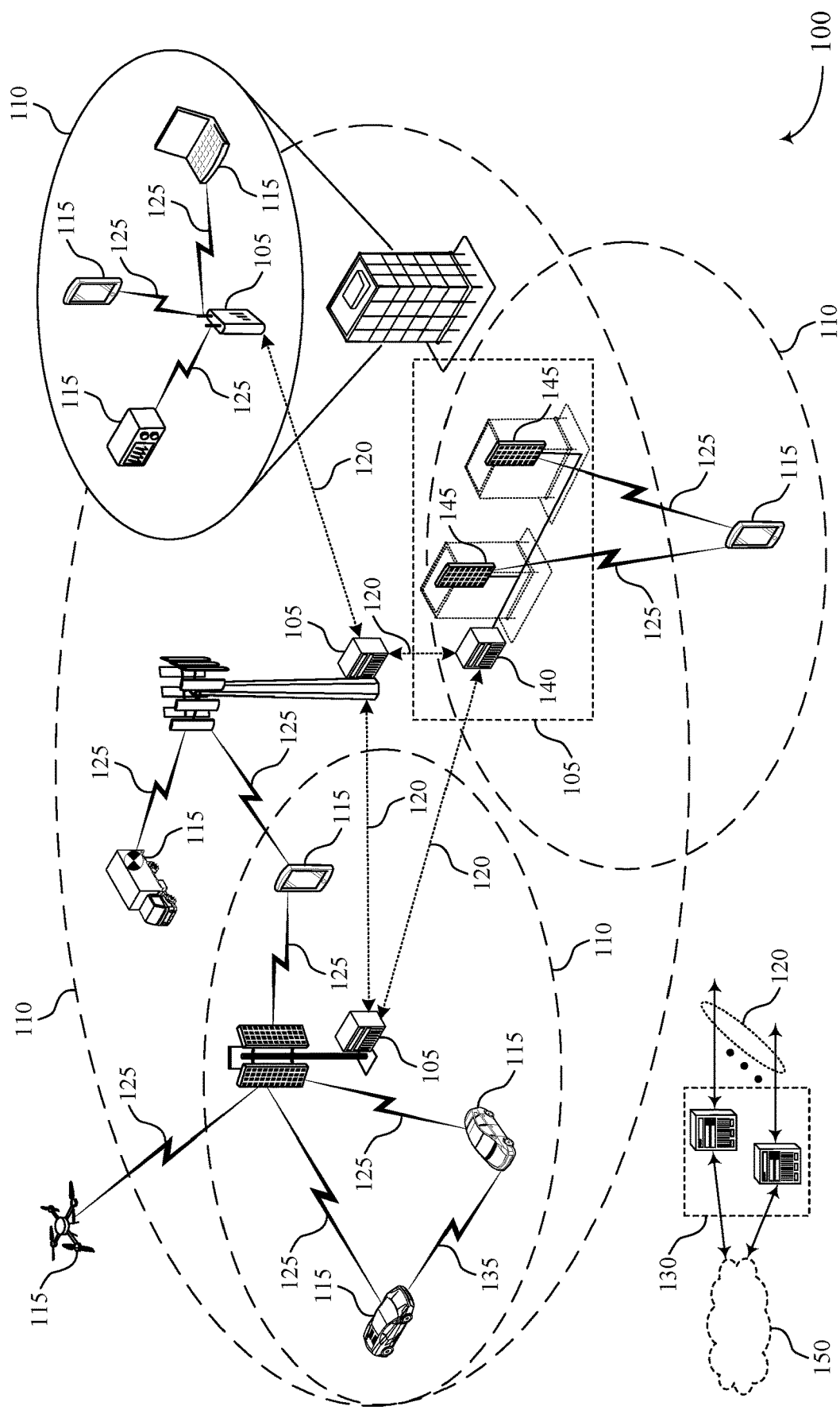
FIGS. 1 and 2 illustrate examples of wireless communications systems for wireless communications that support group scheduling applications in accordance with aspects of the present disclosure.

Some wireless communication systems may include one or more communication devices, such as user equipments (UEs) and base stations, for example, next-generation NodeBs or giga-NodeBs (either of which may be referred to as a gNB) that may support multiple radio access technologies including fourth generation (4G) systems (such as Long Term Evolution (LTE) systems), and fifth generation (5G) systems (which may be referred to as New Radio (NR) systems). The one or more communication devices may, in some examples, support high-reliability and low-latency communications, such as ultra-reliable low-latency communications (URLLC) or Internet of Things (IoT) communications (e.g., industrial IoT (IIoT) communications) related to the above example radio access technologies. Some examples of the one or more communication devices (e.g., one or more base stations) may support scheduling groups of communication devices (e.g., one or more UEs) for high-reliability and low-latency communications.

The one or more communication devices may, in some examples, support multiple active uplink configured grant configurations, as well as multiple active downlink semi-persistent scheduling configurations. Support of one or more of multiple active uplink configured grant configurations or multiple active downlink semi-persistent scheduling configurations may reduce timing for aligning resources related to transmissions (e.g., uplink data), as well as to support multiple service types (e.g., URLLC or enhanced mobile broadband (eMBB)). In some examples, because traffic (e.g., data transmissions) for IoT communications may be periodic, multiple communication devices (e.g., multiple UEs) may be scheduled via uplink grant-free configurations or downlink semi-persistent scheduling configurations to eliminate use of scheduling the multiple communication devices via downlink control information (DCI) signaling via a physical downlink control channel (PDCCH). That is, by scheduling multiple communication devices via uplink grant-free configurations or downlink semi-persistent scheduling configurations, PDCCH blockage issues may be reduced, as well as error or uncertainty in IoT communications may be removed or decreased.

The one or more communication devices (e.g., one or more base stations) may, in some examples, support retransmission of a configured grant. The one or more communication devices may support retransmission of a configured grant based on a dynamic grant. For example, the one or more communication devices (e.g., one or more base stations) may support one or more of an initial transmission or a retransmission of a configured grant via dynamic signaling (e.g., via DCI signaling). The configured grant may include multiple uplink configured grant configurations or multiple downlink semi-persistent scheduling configurations, and the dynamic signaling may carry an indication to activate a configuration from the multiple configurations. For example, a DCI may signal an indication of time and frequency resources related to a retransmission. In some examples, the DCI may be a common DCI that may be shared for all communication devices (e.g., all UEs). As demand for communication efficiency increases, some of the one or more communication devices (e.g., one or more base stations) may fail to provide satisfactory resource allocation related to scheduling groups of other communication devices (e.g., one or more UEs), and thereby may be unable to support or provide satisfactory high-reliability and low-latency communications.

To address the above shortcomings, the described techniques may configure the one or more communication devices (e.g., one or more UEs) to receive control signaling, such as DCI signaling, among other examples, that may configure the one or more communication devices with multiple configured grant configurations. The described techniques may, in some examples, configure the one or more communication devices to receive a group common downlink control information (GC-DCI), which may correspond to multiple communication devices. In some examples, the one or more communication devices may receive the GC-DCI via a group control channel, for example, such as a group common PDCCH (GC-PDCCH). The GC-DCI may carry a configuration indication relating to a configured grant configuration for the one or more communication devices to use from the multiple configured grant configurations. The described techniques may therefore configure the one or more communication devices to support high-reliability and low-latency communications in accordance with a configured grant configuration based on the configuration indication in the GC-DCI.

Particular aspects of the subject matter described in this disclosure may be implemented to realize one or more of the following potential advantages. The techniques employed by the described one or more communication devices may provide benefits and enhancements to the operation of the communication devices. For example, operations performed by the described one or more communication devices may provide improvements to group scheduling applications. In some examples, the described one or more communication devices may support receiving signaling including a configuration indication relating to a configured grant configuration to use from multiple configured grant configurations that may support improvements to power consumption, spectral efficiency, higher data rates and, in some examples, may promote enhanced efficiency for high reliability and low latency operations, among other benefits.

Aspects of the disclosure are initially described in the context of wireless communications systems. Aspects of the disclosure are then illustrated by and described with reference to a process flow that relates to group scheduling. Aspects of the disclosure are further illustrated by and described with reference to apparatus diagrams, system diagrams, and flowcharts that relate to group scheduling in wireless communications systems.

FIG. 1 illustrates an example of a wireless communications system 100 that supports group scheduling applications in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, and/or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like. The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for the communication links 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 megahertz (MHz)). Devices of the wireless communications system 100 (e.g., base stations 105, UEs 115, or both) may have hardware configurations that support communications over a particular carrier bandwidth or may be configurable to support communications over one of a set of carrier bandwidths. In some examples, the wireless communications system 100 may include base stations 105 and/or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into BWPs having the same or different numerologies. In some examples, a UE 115 may be configured with multiple BWPs. In some cases, a single BWP for a carrier is active at a given time, and communications for the UE 115 may be restricted to active BWPs.

Time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some cases, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, base stations 105 may transmit and UEs 115 may receive control signaling that configures UEs 115 with a set of configured grant configurations. The base stations 105 may, additionally, transmit and UEs 115 may receive, via a group control channel, GC-DCI for multiple UEs 115. As a result, base stations 105 and UEs 115 may communicate data transmission in accordance with a configured grant configuration of the set of configured grant configuration based on a configuration indication for the UEs 115 in the GC-DCI indicating the configured grant configured.

Each base station 105 may provide communication coverage via one or more cells, for example a macro cell, a small cell, a hot spot, or other types of cells, or various combinations thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, exterior spaces between or overlapping with geographic coverage areas 110, or the like.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to UEs 115 with service subscriptions with the network provider or may provide restricted access to UEs 115 having an association with the small cell (e.g., UEs 115 in a closed subscriber group (CSG), UEs 115 associated with users in a home or office, and the like). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB), or others) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a predefined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support URLLC or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between UEs 115 and base stations 105, and EHF antennas of the respective devices may be smaller and more closely spaced than UHF antennas. In some cases, this may facilitate use of antenna arrays within a device. The propagation of EHF transmissions, however, may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions and may report to the base station 105 an indication of the signal that the UE 115 received with a highest signal quality, or an otherwise acceptable signal quality.

In some cases, transmissions by a device (e.g., by a base station 105 or UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

UEs 115 and base stations 105 may support retransmissions of data to increase the likelihood that data is received successfully. Hybrid automatic repeat request (HARQ) feedback is one technique for increasing the likelihood that data is received correctly over the communication links 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some cases, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
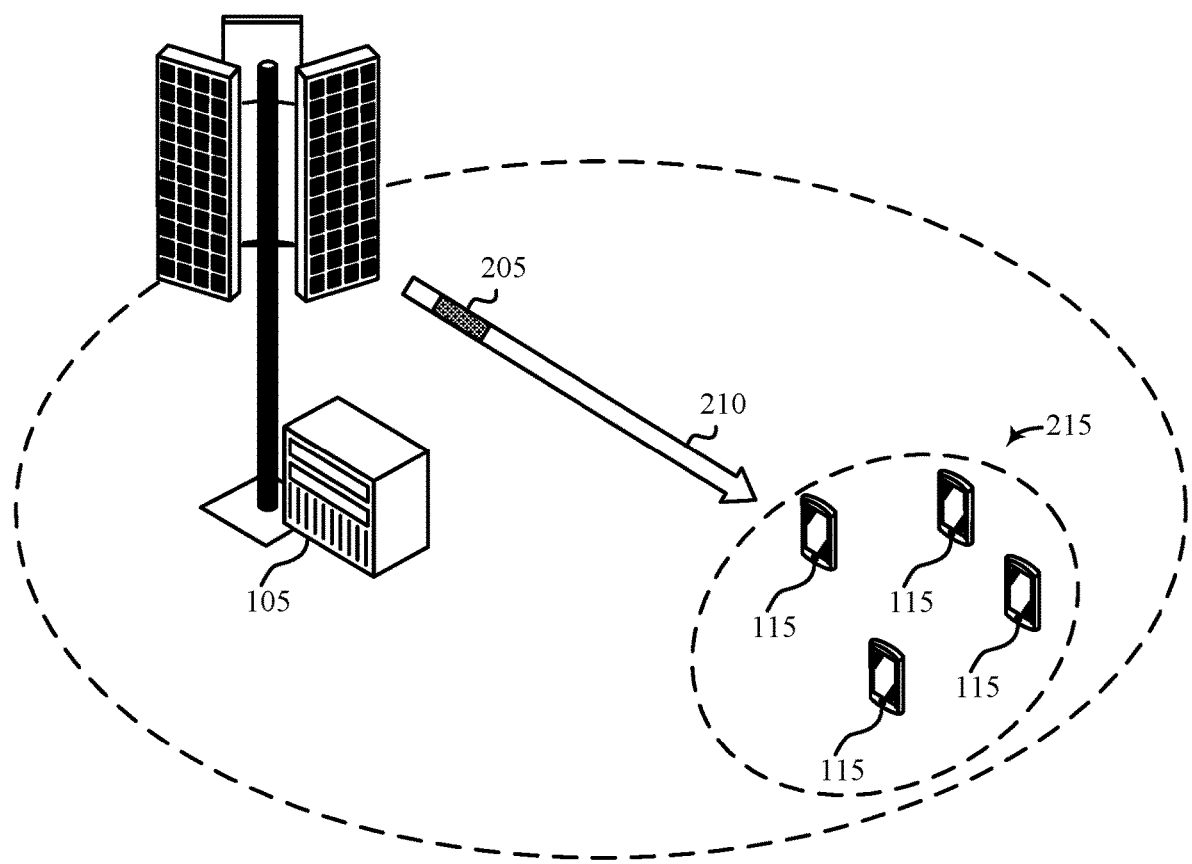

FIG. 2 an example of a wireless communications system 200 that supports group scheduling in accordance with aspects of the present disclosure. The wireless communications system 200 may include a base station 105 and multiple UEs 115, which may be examples of the corresponding devices described with reference to FIG. 1. In some examples, the wireless communications system 200 may implement aspects of the wireless communications system 100. For example, the UEs 115 in the wireless communications system 200 may support receiving signaling including a configuration indication relating to a configured grant configuration to use from multiple configured grant configurations. As a result, the UEs 115 may support improvements to power consumption, spectral efficiency, higher data rates and, in some examples, may promote enhanced efficiency for high-reliability and low-latency operations, among other benefits.

The base station 105 may support downlink transmission and one or more of the UEs 115 may support downlink reception. The base station 105 may, in some examples, transmit, to one or more of the UEs 115, a scheduling command for scheduling time and frequency resources for communications, such as URLLC communications or IoT communications, among other examples. For example, the base station 105 may transmit a scheduling command in a DCI via a PDCCH. In some examples, the scheduling command may be an indication to one or more of the UEs 115 of an upcoming data transmission from the base station 105. In some examples, the scheduling command may also carry additional information about the upcoming data transmission, such as an amount of data, a time and frequency allocation (e.g., a physical resource block (PRB) allocation), a modulation scheme (e.g., quadrature phase-shift keying (QPSK), quadrature amplitude modulation (QAM)), among other examples.

The base station 105 may subsequently transmit the data transmission to one or more of the UEs 115, for example, via one or more of a downlink shared channel (DL-SCH) or a physical downlink shared channel (PDSCH). One or more of the UEs 115 may respond to the base station 105 by transmitting a hybrid ARQ acknowledgment to indicate whether the data transmission was received correctly. One or more of the UEs 115 may transmit the acknowledgment on a physical uplink shared channel (PUSCH) or a physical uplink control channel (PUCCH). The base station 105 may also support uplink reception and one or more of the UEs 115 may support uplink transmissions. Similarly, as in downlink transmission and reception, the base station 105 may transmit a scheduling grant to one or more of the UEs 115 via the PDCCH. The grant may include one or more transmission parameters for one or more of the UEs 115, for example, such as a transport block size, a time and frequency resource allocation, a modulation scheme, among other transmission parameters.

In some examples, the base station 105 may configure one or more of the UEs 115 with multiple configured grant configurations to support improvements in communications, such as URLLC communications or IoT communications by one or more of the UEs 115. For example, the base station 105 may transmit control signaling that configures one or more of the UEs 115 with multiple configured grant configurations. In some examples, configured grant configurations of the multiple configured grant configurations may include one or more of downlink configurations or uplink configurations. Each configured grant configuration of the multiple configured grant configurations may also have varying parameters, for example, different transport block sizes, time and frequency resource allocation, modulation schemes, among other examples.

To schedule the multiple UEs 115, the base station 105 may transmit a GC-DCI 205 via a group control channel 210 to a group 215 of UEs 115. In some examples, the group control channel 210 may be a group common PDCCH (GC-PDCCH). The base station 105 may, in some examples, include a configuration indication in the GC-DCI 205 that may indicate to the group 215 which configured grant configuration to use (e.g., activate, enable) from the multiple configured grant configurations for data transmissions. The base station 105 may use the configuration indication mechanism for both downlink and uplink configurations.

In some examples, the base station 105 may configure the group 215 with one or more downlink resource configurations via a higher layer signaling, for example, such as an RRC signaling or a MAC control element (CE) (MAC-CE) signaling, among other examples. Additionally or alternatively, the base station 105 may configure the group 215 with one or more uplink resource configurations, such as multiple uplink configured grants. In some examples, an uplink configured grant may be an uplink type one configured grant (UL type 1 CG) or an uplink type two configured grant (UL type 2 CG). The base station 105 may provide one or more transmission parameters related to one or more of the uplink type one configured grant or the uplink type two configured grant to the group 215 of UEs 115 via DCI.

The base station 105 may configure one or more of the UEs 115 of the group 215 with the GC-PDCCH. In some examples, configuring one or more of the UEs 115 of the group 215 may include configuring the UEs 115 with a radio network temporary identifier (RNTI), which one or more of the UEs 115 may use to monitor group scheduling and receive the GC-DCI 205 via the GC-PDCCH. In some examples, the RNTI may be a default RNTI or may reuse an existing RNTI (e.g., reuse a cell specific RNTI (CS-RNTI)). In other examples, the base station 105 may configure the UEs 115 with a new RNTI. The base station 105 may, in some examples, scramble a DCI payload (e.g., a total length) of the GC-DCI 205 with one of the above example RNTIs. That is, the parameter dci-PayloadSize may include a total length of the DCI payload scrambled with the above-mentioned RNTI. The UEs 115 of the group 215 may therefore receive the GC-DCI 205 via the group control channel 210 based on one or more of a group identifier (e.g., RNTI) or a payload size for the GC-DCI 205.

In some examples, the UEs 115 of the group 215 may receive the GC-DCI 205 via the group control channel 210 based on a serving cell identifier (e.g., servingCellId), which may relate to a serving cell (e.g., associated with the base station 105) for which group scheduling may be applicable. This may enable the UEs 115 of the group 215 to support one or more of a cross-carrier activation, a cross-carrier re-activation, or a cross-carrier deactivation for the multiple configured grant configurations. In some cases, one or more configured grant configurations may be activated across carriers. This may be useful when one carrier is blocked, or was not able to pass a contention-based procedure (e.g., a listen-before-talk (LBT) procedure) in an unlicensed channel. In some examples, the GC-DCI 205 may include multiple DCI fields, which may map to different UEs 115 of the group 215 and to a configured grant configuration to use (e.g., activate, enable) from the multiple configured grant configurations for data transmissions. That is, a position-InDCl parameter may be defined by the (starting) position (bit) of the DCI for the UEs 115 in a serving cell given by a serving cell identifier (e.g., a servingCellId), within the DCI payload. The base station 105 and the UEs 115 may also support the interaction of GC-DCI 205 and UE-specific DCI for one or more of initial scheduling or retransmission. An exemplary GC-DCI is further described in more detail herein with reference to FIG. 3.

Figure 3:
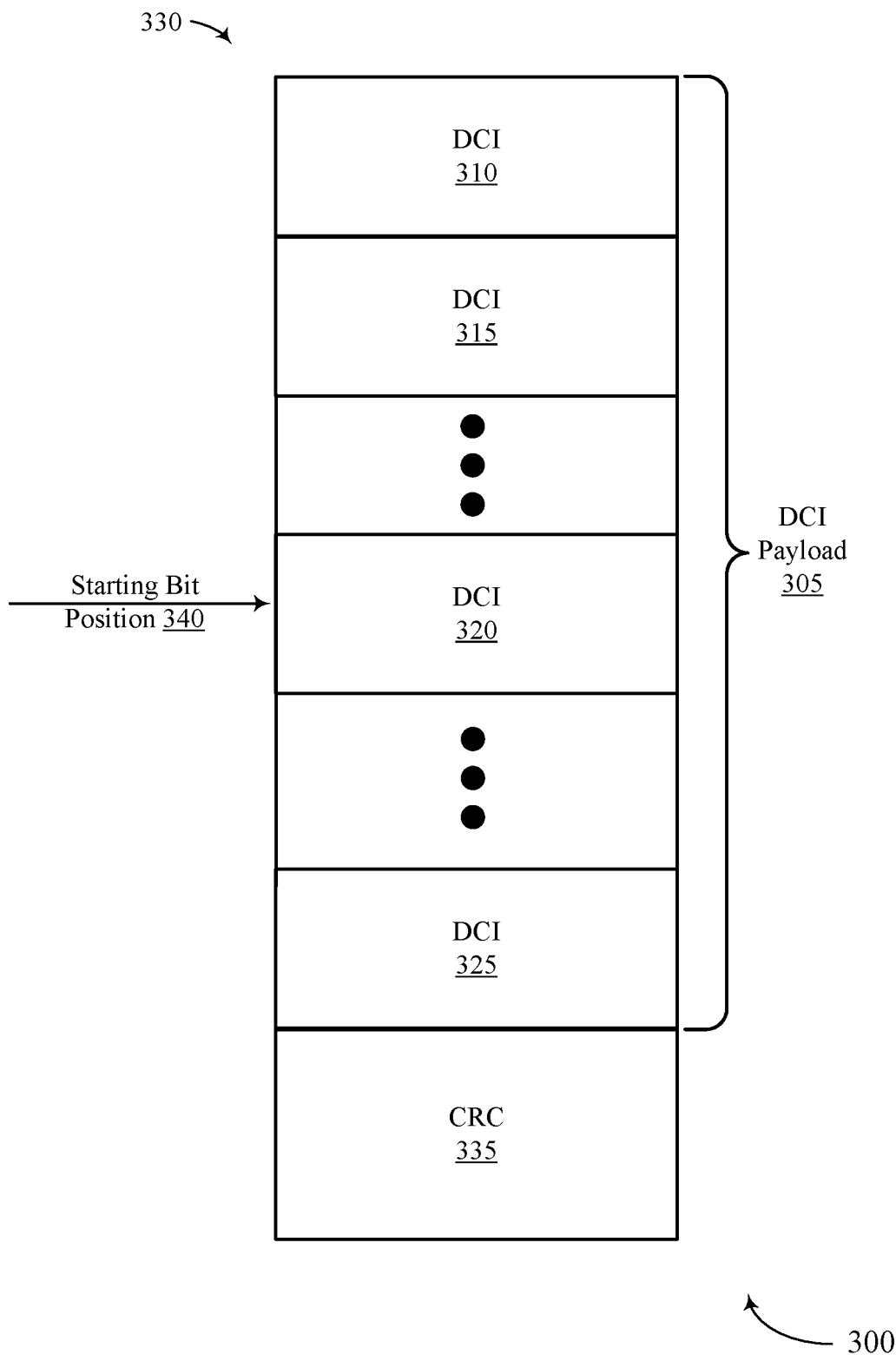
FIG. 3 illustrates an example of a group common downlink control information (GC-DCI) that supports group scheduling applications in accordance with aspects of the present disclosure.

FIG. 3 illustrates an example of a GC-DCI 300 that supports group scheduling applications in accordance with aspects of the present disclosure. The GC-DCI 300 may have a DCI payload 305 carrying multiple control fields also referred to as DCI fields. For example, the DCI payload 305 may include a DCI field 310, a DCI field 315, a DCI field 320, and a DCI field 325. With reference to FIG. 2, the base station 105 may transmit downlink scheduling commands, uplink scheduling grants and uplink control commands, among other examples to the UEs 115 of the group 215 via the multiple DCI fields 330. The uplink scheduling grants may include multiple configured grant configurations. In some examples, the GC-DCI 300 may have CRC 335 appended to the DCI payload 305 to improve reliability of transmission and reception of the GC-DCI 300.

In some examples, the multiple DCI fields 330 may correspond to different UEs 115 of the group 215 and to a configured grant configuration to use (e.g., activate, enable) from multiple configured grant configurations for data transmissions. In some examples, the base station 105 may indicate an assignment of a DCI field from the multiple DCI fields 330 to each UE 115 of the group 215 based on a starting position indicator. That is, each DCI bit field may correspond to a different UE 115 from the group 215. For example, the base station 105 may indicate to a UE 115 of the group 215 to use the DCI field 320 from the multiple DCI fields 330 based on a starting position bit 340. The UE 115 may therefore identify a configuration indication within the GC-DCI 300 based on the starting position bit 340 corresponding to the DCI field 320. The starting position bit 340 of the DCI field 320 for the UE 115 may correspond to a serving cell given by a serving cell identifier within the DCI payload 305. The UE 115 may, as a result, decode the GC-DCI 300 corresponding to the starting position bit 340 to obtain at least one transmission parameter, and communicate data transmission accordingly.

In some examples, the base station 105 may configure each DCI bit field of the multiple DCI fields 330 to indicate specific information. In an example, the base station 105 may configure the multiple DCI fields 330 to indicate a grant configuration index mapping to a grant configuration of the multiple configured grant configurations. As such, each grant configuration may have its associated grant configuration index. In some other examples, the base station 105 may also configure the multiple DCI fields 330 to indicate one or more of a time domain resource allocation (TDRA), a modulation coding scheme (MCS), among other examples. For example, the base station 105 may configure the multiple DCI fields 330 with one or more of the TDRA, the MCS, etc. according to a default PDCCH format. In other examples, the base station 105 may also configure the multiple DCI fields 330 to indicate a transmit power control (TPC) command. In some examples, a DCI (bit) field of the multiple DCI fields 330 corresponding to each UE 115 may be configured to indicate one or more of a configuration index, a TPC indication, or both.

Additionally or alternatively, the base station 105 may configure and reserve a code-point within a DCI bit field of the multiple DCI fields 330, to indicate a resource allocation for an initial (or previous) transmission, for improvements to power boosting for in-phase and quadrature-phase (IQ) log-likelihood ratio (LLR) combining. For uplink transmissions, the base station 105 may, in some examples, identify a power headroom before issuing a TPC command for proper LLR combining at the UEs 115 (e.g., at a receiver). For downlink transmissions, the amount of power boosting may depend on one or more scheduling conditions of the base station 105 for retransmission symbols, and may be indicated to the UEs 115. The base station 105 may, in some examples, configure multiple bits per DCI per UE 115. For example, the base station 105 may configure four bits per DCI per UE 115, where two of the four bits (e.g., 00xx) may be reserved to indicate a same grant configuration as an initial (or previous) transmission. The remaining two bits may be used to indicate additional information, for example, such as an amount of power boosting. With using two out of the four bits for power indication, the base station 105 may use the remaining two bits to indicate different possible combinations (e.g., twelve different combinations) of a grant configuration. That is, the base station 105 may have the capability to indicate twelve different grant configurations using the two remaining bits. As such, the base station 105 and the multiple UEs 115 may support twelve uplink configured grant configurations.

Particular aspects of the GC-DCI 300 may be implemented to realize one or more of the following potential advantages. The GC-DCI 300 employed by the base station 105 and the UEs 115 may provide benefits and enhancements to the operation of the UEs 115. For example, operations performed by the base station 105 and the UEs 115 may provide improvements to group scheduling applications. In some examples, the base station 105 and the UEs 115 may support signaling including a configuration indication relating to a configured grant configuration for the UEs 115 to use to support improvements to power consumption, spectral efficiency, higher data rates and, in some examples, may promote enhanced efficiency for high reliability and low latency operations, among other benefits.

Figure 4:
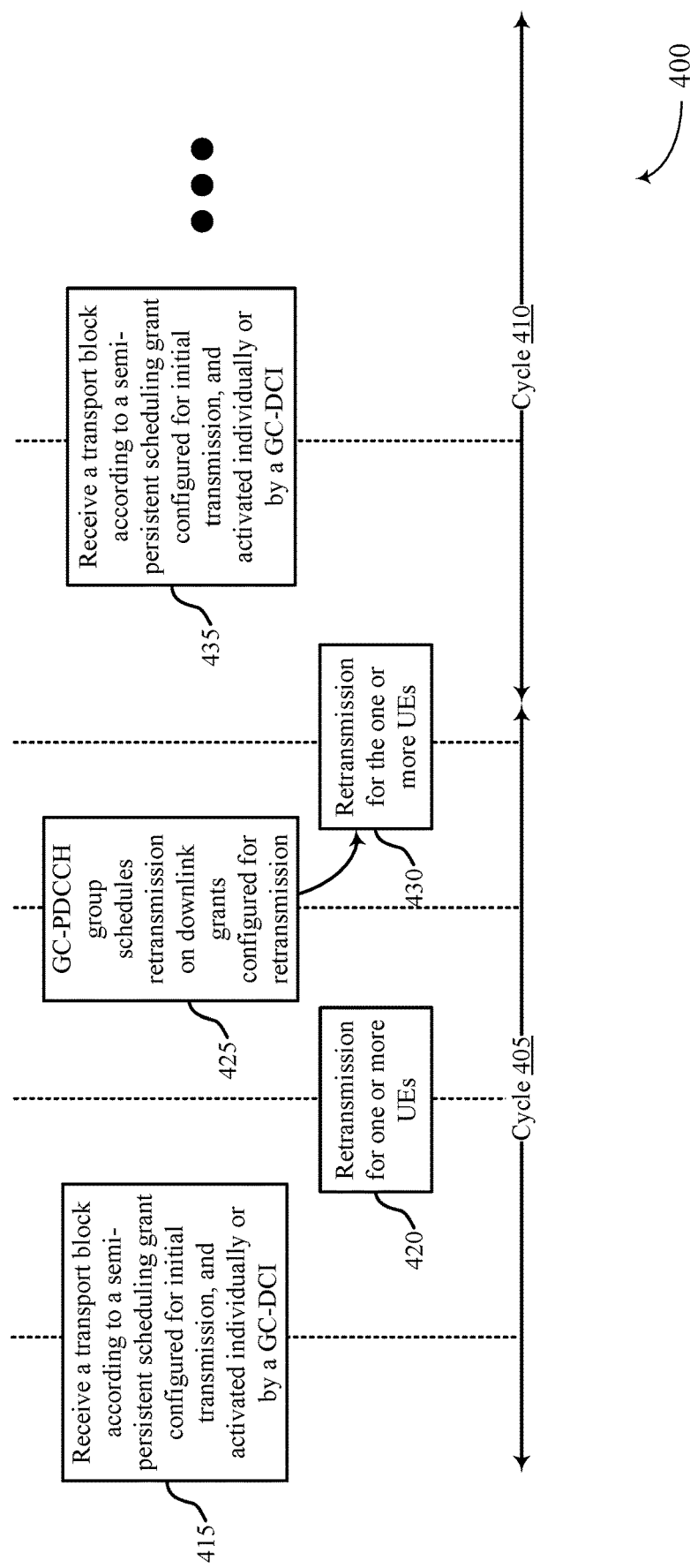
FIGS. 4 through 6 illustrate examples of group scheduling timelines that support group scheduling applications in accordance with aspects of the present disclosure.
Figure 6:
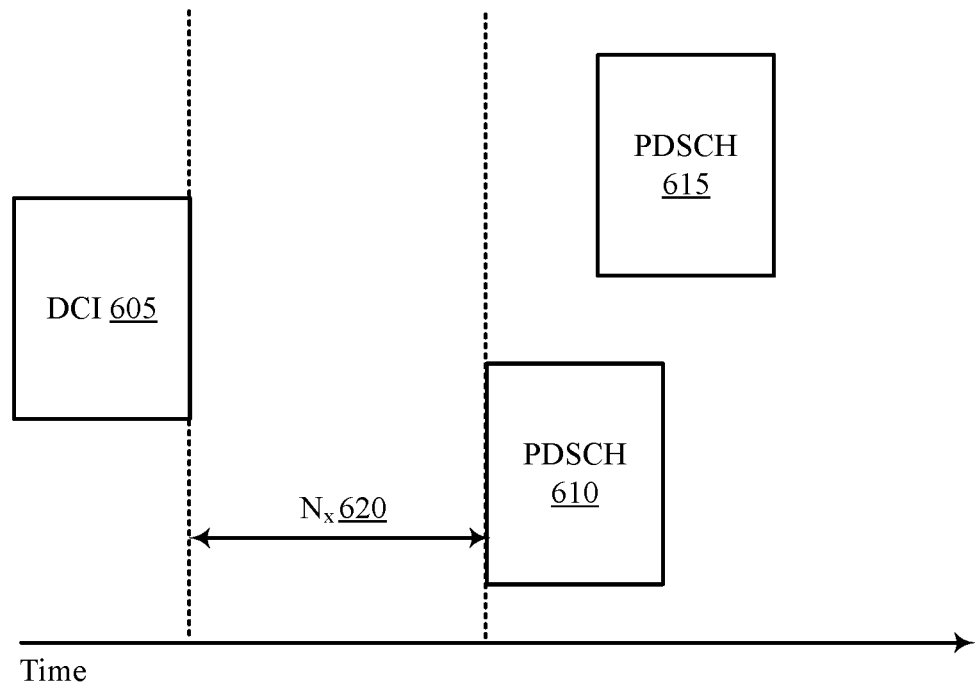

Exemplary group scheduling timelines are further described in more detail herein with reference to FIGS. 4 and 6.

FIG. 4 illustrates an example of a group scheduling timeline 400 that supports group scheduling applications in accordance with aspects of the present disclosure. The group scheduling timeline 400 may relate to a base station 105 and multiple UEs 115, which may be examples of the base stations 105 and the UEs 115 as described with reference to FIGS. 1 and 2. In some examples, the group scheduling timeline 400 may implement aspects of the wireless communications system 100 and 200, as described with reference to FIGS. 1 and 2. For example, the group scheduling timeline 400 may be based on a configuration by the base station 105 or the multiple UEs 115, and implemented by the multiple UEs 115 for reduced power consumption, improved reliability, and may promote low latency for URLLC communications or IoT communications, among other benefits.

The operations of the group scheduling timeline 400 may occur in a different order than the example order shown, or the operations performed by the base station 105 and the multiple UEs 115 may occur in a different order or at different times. Some operations may also be omitted from the group scheduling timeline 400, and other operations may be added to the group scheduling timeline 400. The group scheduling timeline 400 may include a cycle 405 and a cycle 410. In some examples, the cycle 405 and the cycle 410 may be contiguous or noncontiguous in a time domain. For example, the cycle 405 and the cycle 410 may be consecutive or nonconsecutive TTIs. In some examples, the cycle 405 and the cycle 410 may be consecutive or nonconsecutive in subframes or slots. Each slot may include a number of symbol periods. As such, the cycle 405 and the cycle 410 may be consecutive or nonconsecutive in a number of symbol periods. The group scheduling timeline 400 may illustrate an example process between group scheduling and multiple configured grants. More particularly, the group scheduling timeline 400 may illustrate an example of group scheduling with multiple configured grants for downlink transmissions.

At 415, with reference to FIGS. 1 and 2, multiple UEs 115 (e.g., UEs 1, 2, . . . N, where N is a positive value) may receive a transport block according to a semi-persistent scheduling grant configured for initial transmission, and activated individually or by a GC-DCI. That is, in some examples, the base station 105 may separately or jointly enable each UE 115 of the multiple UEs 115 to activate a configured grant from multiple configured grants. For example, the base station 105 may separately enable each UE 115 of the multiple UEs 115 to activate a configured grant via separate dynamic signaling (e.g., per DCI per UE) for each UE 115. Alternatively, the base station 105 may jointly enable the multiple UEs 115 to activate a configured grant via GC-DCI.

The base station 105 may also provide an indication of whether the activated configured grant corresponds to an initial transmission or a retransmission. In some examples, the indication may be explicit per UE 115 (e.g., through a bit in DCI per UE 115 within a GC-DCI, or per group of UEs 115 (e.g., through a single bit in the GC-DCI). Alternatively, the indication may be implicitly signaled by the base station 105, for example via RRC configuration, similarly per UE 115 or per group of UEs 115.

At 420, the base station 105 may determine retransmission for one or more UEs 115 (e.g., $UE_k$, $UE_m$) of the multiple UEs 115. At 425, the base station 105 may transmit a GC-PDCCH that schedules retransmission on downlink grants configured for retransmission. At 430, the base station 105 may perform retransmission for the one or more UEs 115. At 435, during the cycle 410, one or more operations may repeat. For example, the multiple UEs 115 may receive a transport block according to a semi-persistent scheduling grant configured for initial transmission, and activated individually or by a GC-DCI.

Figure 5:
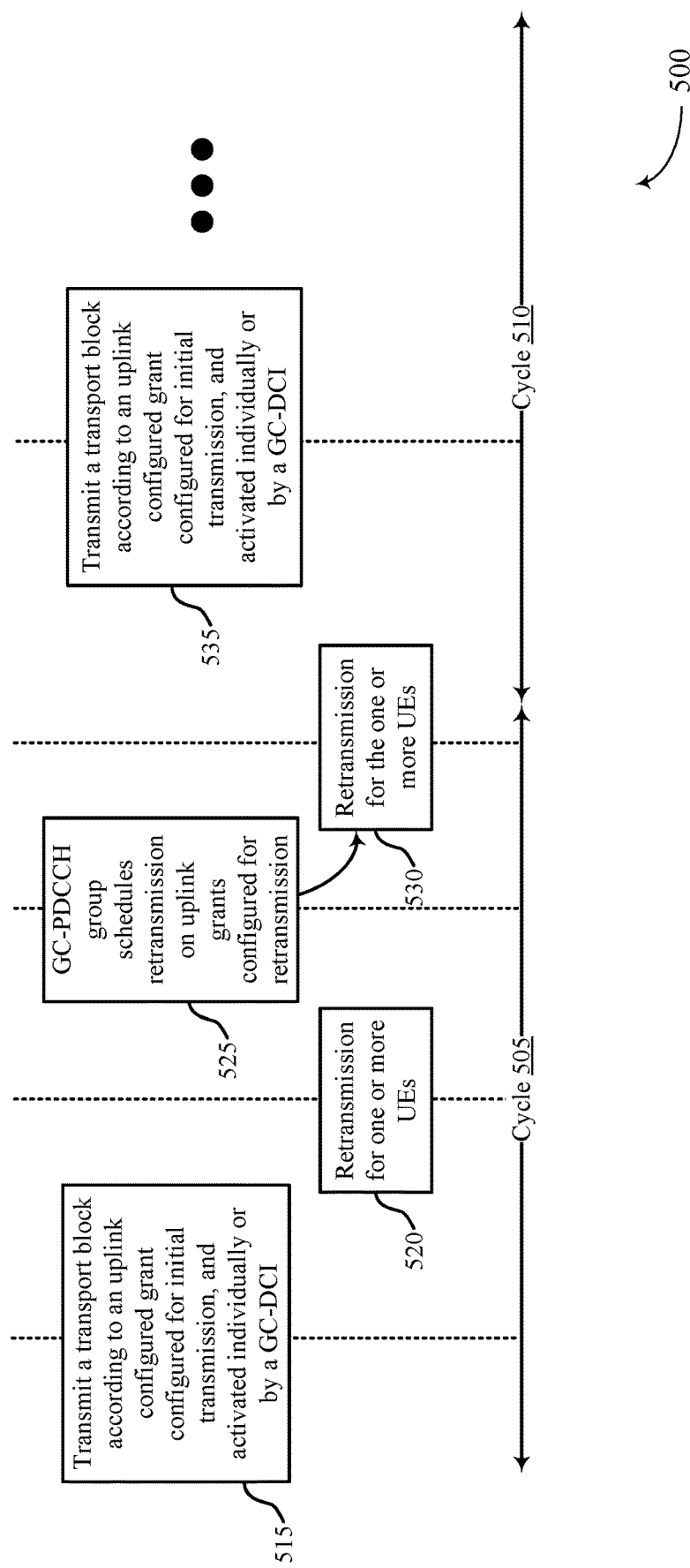

FIG. 5 illustrates an example of a group scheduling timeline 500 that supports group scheduling applications in accordance with aspects of the present disclosure. The group scheduling timeline 500 may relate to a base station 105 and multiple UEs 115, which may be examples of the base stations 105 and the UEs 115 as described with reference to FIGS. 1 and 2. In some examples, the group scheduling timeline 500 may implement aspects of the wireless communications system 100 and 200, as described with reference to FIGS. 1 and 2. For example, the group scheduling timeline 500 may be based on a configuration by the base station 105 or the multiple UEs 115, and implemented by the multiple UEs 115 for reduced power consumption, improved reliability, among other benefits.

The operations of the group scheduling timeline 500 may occur in a different order than the example order shown, or the operations performed by the base station 105 and the multiple UEs 115 may occur in a different order or at different times. Some operations may also be omitted from the group scheduling timeline 500, and other operations may be added to the group scheduling timeline 500. The group scheduling timeline 500 may include a cycle 505 and a cycle 510. In some examples, the cycle 505 and the cycle 510 may be contiguous or noncontiguous in a time domain. For example, the cycle 505 and the cycle 510 may be consecutive or nonconsecutive TTIs. In some examples, the cycle 505 and the cycle 510 may be consecutive or nonconsecutive in subframes or slots. Each slot may include a number of symbol periods. As such, the cycle 505 and the cycle 510 may be consecutive or nonconsecutive in a number of symbol periods. The group scheduling timeline 500 may illustrate an example process between group scheduling together with multiple configured grants. More particularly, the group scheduling timeline 500 may illustrate an example of group scheduling with multiple configured grants for uplink transmissions.

At 515, with reference to FIGS. 1 and 2, multiple UEs 115 (e.g., UEs 1, 2, . . . N, where N is a positive value) may transmit a transport block according to an uplink configured grant configured for initial transmission, and activated individually or by a GC-DCI. That is, in some examples, the base station 105 may separately or jointly enable one or more UEs 115 of the multiple UEs 115 to activate a configured grant from a plurality of configured grants. For example, the base station 105 may separately enable each UE 115 of the multiple UEs 115 to activate a configured grant via separate dynamic signaling (e.g., per DCI per UE) for each UE 115. Alternatively, the base station 105 may jointly enable the multiple UEs 115 to activate a configured grant via GC-DCI. The base station 105 may also provide an indication of whether the activated configured grant corresponds to an initial transmission.

In some examples, the indication may be explicitly per UE 115 (e.g., through a bit in DCI per UE 115 within a GC-DCI, or per group of UEs 115 (e.g., through a single bit in the GC-DCI). Alternatively, the indication may be implicitly signaled by the base station 105, for example via RRC configuration, similarly per UE 115 or per group of UEs 115. At 520, the base station 105 may determine retransmission for one or more UEs 115 (e.g., $UE_k$, $UE_m$) of the multiple UEs 115. At 525, the base station 105 may transmit a GC-PDCCH that schedules retransmission on uplink grants configured for retransmission. At 530, the base station 105 may perform retransmission for the one or more UEs 115. At 535, during the cycle 510, one or more operations may repeat, for example, one or more UEs 115 of the multiple UEs 115 may transmit a transport block on uplink configured grants configured for initial transmission, activated individually or by GC-DCI.

Returning to FIG. 2, in some examples, if the base station 105 activates a semi-persistent scheduled grant (or an uplink configured grant) via the GC-DCI 205 (e.g., a GC-DCI) for retransmission, the configured grant may be valid for a single retransmission and may be automatically released afterward (e.g., without a deactivation command or a release command). For example, one or more of the UEs 115 of the group 215 may release a configured grant corresponding to a configured grant configuration without a deactivation command or a release command.

In some examples, if the base station 105 activates a semi-persistent scheduled grant (or an uplink configured grant) via the GC-DCI 205 for retransmission, a feedback identifier (e.g., a HARQ identifier) may be obtained. For example, one or more of the UEs 115 of the group 215 may determine a feedback identifier corresponding to the data transmission, which may be a retransmission. In some examples, one or more of the UEs 115 of the group 215 may determine the feedback identifier implicitly. For example, the feedback identifier may relate to a previous feedback identifier (e.g., a last received or transmitted HARQ identifier). This may be applicable for IoT communications where an initial transmission may be according to a semi-persistent scheduled grant (or an uplink configured grant). If the initial transmission is according to a dynamic grant, missing a grant may have adverse effects on the base station 105 and the multiple UEs 115 (e.g., unable to implicitly determine feedback identifier). Alternatively, one or more of the UEs 115 of the group 215 may determine the feedback identifier based on explicit signaling from the base station 105. For example, the base station 105 may include a feedback identifier field (e.g., a HARQ identifier field) for DCI per UE 115 in the GC-DCI 205.

In some examples, if the base station 105 activates an uplink configured grant via the GC-DCI 205 for retransmission, a timer associated to a feedback identifier corresponding to a retransmission may be started or restarted. For example, one or more of the UEs 115 of the group 215 may start a timer for the feedback identifier corresponding to the data transmission, which may be the retransmission. In some examples, if the base station 105 activates a semi-persistent scheduled grant (or an uplink configured grant) via the GC-DCI 205 for a new transport block transmissions, the configured grants may be valid till a deactivation command or a release command is decoded by the one or more UEs 115 of the group 215. That is, the configured grant after activation may be treated as if it could be activated or reactivated by unicast DCI. In this case, the one or more UEs 115 of the group 215 may determine a feedback identifier from one or more of transmission or reception occasions (i.e., no explicit field for feedback).

Alternatively, in some examples, the base station 105 may activate a semi-persistent scheduled grant (or an uplink configured grant) via the GC-DCI 205 for initial transmission where the grant is not repeated (i.e., the configured grant is automatically released). In this case, a feedback identifier field per UE 115 may indicate which feedback process (e.g., HARQ process) is scheduled by the GC-DCI 205. In some examples, whether the feedback identifier (e.g., a HARQ identifier bit field in a GC-DCI) is included may permit the UE 115 to implicitly differentiate if a grant for new transport blocks are repeated (e.g., GC-DCI does not include the HARQ identifier bit field) or is a single grant (e.g., GC-DCI includes the HARQ identifier bit field). In some examples, the GC-DCI 205 may be used for a single transmission. In this case, the grant carried in the GC-DCI 205 may not be repeated.

In some examples, the control signaling may include a HARQ field, and the UEs 115 of the group 215 may determine that the GC-DCI 205 activates a semi-persistent resource or an uplink configured grant resource for a single initial transmission where a corresponding grant is not repeated (e.g., the configured grant is automatically released) based on the control signaling indicating that the GC-DCI 205 includes the HARQ field. Alternatively, in some examples, the control signaling may indicate that the GC-DCI 205 does not include a HARQ field. As such, the UEs 115 of the group 215 may determine that the GC-DCI 205 activates a semi-persistent resource or an uplink configured grant resource for an initial transmission where a grant is repeated (e.g., valid until deactivation/release is decoded) based on the control signaling indicating an absence of a HARQ field in the GC-DCI 205.

The base station 105 and the UEs 115 may, in some examples, benefit from using a HARQ process number (HPN) field in a DCI to indicate which HARQ identifier is being transmitted. In some examples, if a DCI is configured to include an HPN field, the UEs 115 will be indicated that the grant for initial transmission is valid for a single transmission or reception. Alternatively, if an HPN is not configured then it would indicate the grant is repeated (i.e., it is a downlink semi-persistent scheduled resource or an uplink configured resource), because the HARQ identifier in the semi-persistent scheduled or uplink configured grant is obtained from reception or transmission occasion (e.g., there may be no need to include HPN bit field).

In some examples, the base station 105 may activate or reactive a semi-persistent scheduled grant or a type two uplink configured grant through the GC-DCI 205 for an initial transport block transmission, while reactivation or deactivation may be transmitted through unicast DCIs. Alternatively, the base station 105 may activate or reactive a semi-persistent scheduled grant or a type two uplink configured grant through a unicast DCI, while it can be reactivated or released by the GC-DCI 205. For a semi-persistent scheduled grant released by the GC-DCI 205, the UEs 115 may transmit an acknowledgment in a PUCCH resource that may be RRC configured per UE 115, or indicated by DCI in the GC-DCI 205 per UE 115.

In some examples of group scheduling with a single DCI, the base station 105 may use one or more techniques to indicate to different UEs 115 of the group 215 a DCI bit field (e.g., DCI bit $K_0$ and DCI bit $K_1$). In an example, the base station 105 may configure a DCI bit $K_0$ via RRC configuration (e.g., RRC configured values) that come with TDRA for one or more of the DCI bit $K_0$ and a DCI bit $K_2$. Alternatively, in some examples, the base station 105 may configure a DCI bit $K_1$ via a dynamic indication, for example, via DCI signaling. In some examples, the DCI bit $K_0$ may correspond to a delay between downlink grant and corresponding downlink data reception (e.g., via a PDSCH). In some examples, the DCI bit $K_1$ may correspond to a delay between downlink data reception (e.g., via a PDSCH) and corresponding acknowledgement transmission on uplink. In some examples, the DCI bit $K_2$ may correspond to a delay between an uplink grant reception in downlink and uplink data (e.g., via a PUSCH) transmission. The base station 105 may also explicitly indicate in a DCI per UE bit-field indication for any or all of $K_0$, $K_1$, and $K_2$, from which the base station 105 and the UEs 115 may benefit due to having more flexibility at a cost of more total DCI size. In some examples, the base station 105 may support one indication in a DCI for any or all of $K_0$, $K_1$, and $K_2$ for the UEs 115 of the group 215 (e.g., all UEs) within the GC-DCI 205.

In some examples, in downlink with group scheduling, the base station 105 may support various techniques for providing an indication of one or more PUCCH resources for HARQ-ACK per UE 115. In an example, the base station 105 may configure one or more PUCCH resources for HARQ-ACK via RRC configuration. With multiple UEs 115 scheduled by GC-DCI, PUCCH resource management may become problematic by simply using RRC configuration. As such, the base station 105 may alternatively introduce a PUCCH resource indication (PRI) in a DCI bit map. This may be accompanied with some higher layer signaling (e.g., MAC-CE signaling, RRC signaling) to further prune out PUCCH resource indication by a DCI. For example, for a first set of PUCCH resources where a set size can be up to 32 PUCCH resources, a MAC-CE down-selects to 8 (or 4) resources; then 3 (or 2) bits in a DCI may indicate which PUCCH resource to be used per UE 115.

FIG. 6 illustrates an example of a group scheduling timeline 600 that supports group scheduling applications in accordance with aspects of the present disclosure. The group scheduling timeline 600 may relate to a base station 105 and multiple UEs 115, which may be examples of the base stations 105 and the UEs 115 as described with reference to FIGS. 1 and 2. In some examples, the group scheduling timeline 600 may implement aspects of the wireless communications system 100 and 200, as described with reference to FIGS. 1 and 2. For example, the group scheduling timeline 600 may be based on a configuration by the base station 105 or the multiple UEs 115, and implemented by the multiple UEs 115 for reduced power consumption, improved reliability, and which may promote low latency for URLLC communications or IoT communications, among other benefits.

With reference to FIGS. 1 and 2, the group scheduling timeline 600 may illustrate a UE 115 behavior when grants from a GC-DCI overlap with unicast DCI. In some examples, if one or more UEs 115 receive a grant from a GC-DCI and a unicast DCI that overlaps in a time domain (e.g., for a given HARQ identifier), the one or more UEs 115 may follow a UE specific grant. In some examples, the one or more UEs 115 may follow a UE-specific grant if a number of symbols Nx 620 (e.g., a number of symbols between a last symbol of a PDCCH carrying a DCI 605 for a UE-specific grant and a first symbol of an overlapping grant (e.g., associated with a PDSCH 610 and a PDSCH 615) is greater than N+X, where X can be zero or one, etc. In some examples, for downlink transmission, N=N1 (4.5 OFDM symbols (OS) for 30 kHz subcarrier spacing). In some examples, for uplink transmission, N=N2 (5.5 OS for 30 kHz subcarrier spacing). In other examples, the one or more UEs 115 may follow a UE specific grant if a GC-PDCCH ends after a UE specific PDCCH. In some examples, the one or more UEs 115 may refrain from receiving overlapping grants from GC-DCI and unicast DCI that do not satisfy the above criteria. In some examples, the one or more UEs 115 may identify an error based on a number of symbols Nx 620 between a last symbol of a control channel (e.g., PDCCH) that transports a unicast DCI and a first symbol indicated in a grant, or a second grant not satisfying a threshold or based on a last symbol of the group control channel that transports the GC-DCI not ending after a last symbol of a second control channel that transports the unicast DCI, or both.

Figure 7:
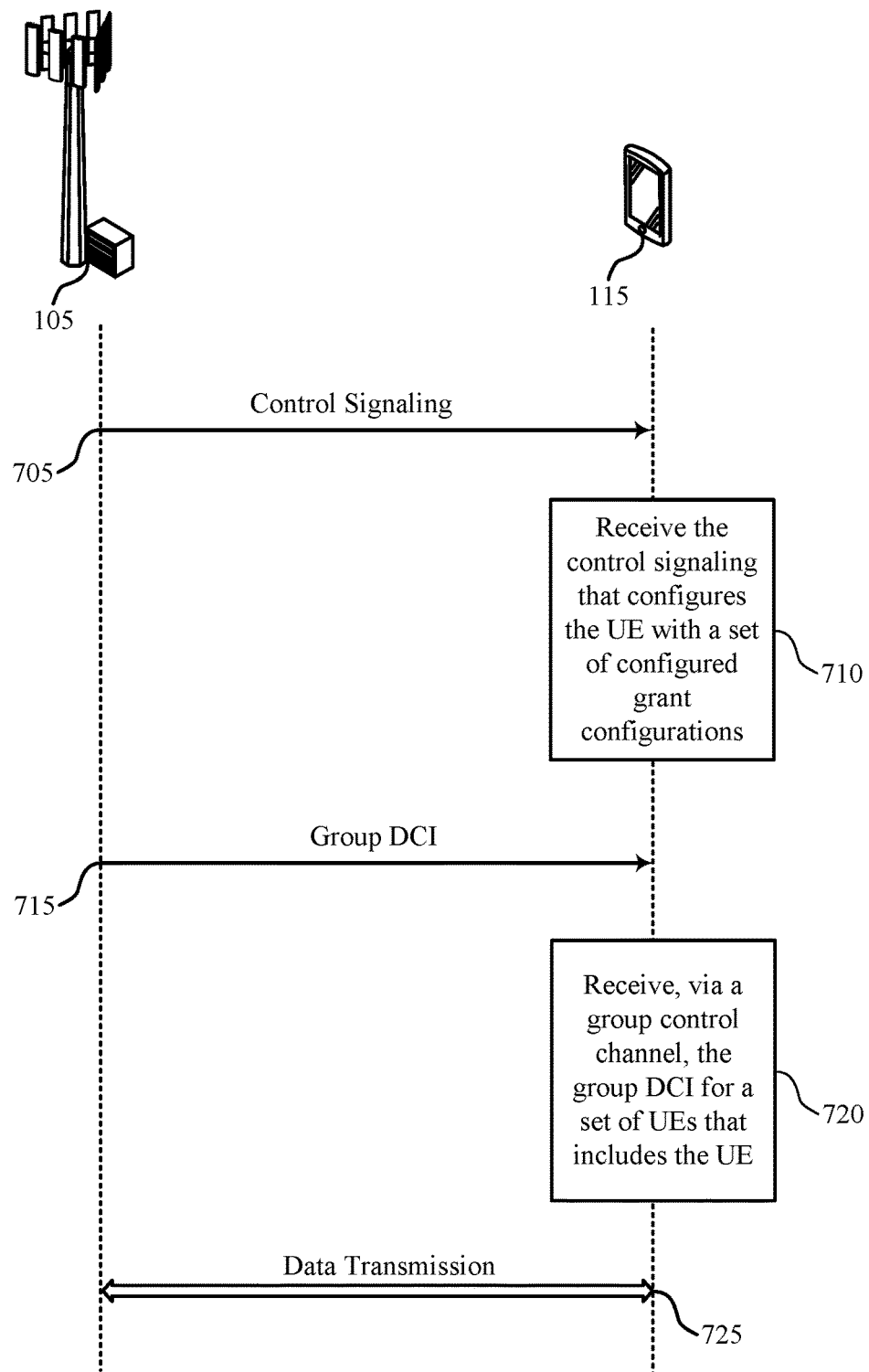
FIG. 7 illustrates an example of a process flow that supports group scheduling applications in accordance with aspects of the present disclosure.

FIG. 7 illustrates an example of a process flow 700 that supports group scheduling applications in accordance with aspects of the present disclosure. The process flow 700 may implement aspects of the wireless communications system 100 and 200, as described with reference to FIGS. 1 and 2. For example, the process flow 700 may be based on a configuration by a base station 105 or a UE 115, and implemented by the UE 115 for reduced power consumption, improved reliability for wireless communications, and may promote low latency for wireless communications, among other benefits. The process flow 700 may include a base station 105 and a UEs 115 of a group of UEs 115 which may be examples of UEs 115 as described with reference to FIGS. 1 and 2. In the following description of the process flow 700, the operations between the base station 105 and the UE 115 may be transmitted in a different order than the example order shown, or the operations performed by the base station 105 and the UE 115 may be performed in different orders or at different times. Some operations may also be omitted from the process flow 700, and other operations may be added to the process flow 700.

At 705, the process flow 700 may commence with the base station 105 transmitting control signaling to the UE 115. At 710, the UE 115 may receive the control signaling that configures the UE 115 with a set of configured grant configurations. At 715, the base station 105 may transmit a group DCI (e.g., GC-DCI) to the UE 115. At 720, the UE 115 may receive, via a group control channel, the group DCI for a set of UEs that includes the UE 115. In some examples, receiving the control signaling may include the UE 115 receiving the control signaling that indicates a group identifier assigned to multiple UEs 115. The group DCI may be received based on the group identifier. In some examples, receiving the control signaling may include the UE 115 receiving the control signaling that indicates a payload size for the group DCI. The group DCI may be received by the UE 115 based on the payload size. In some other examples, receiving the control signaling may include the UE 115 receiving the control signaling that indicates a serving cell identifier. At 725, the UE 115 may communicate a data transmission to the base station 105, for example, according to a configured grant configuration of the set of configured grant configurations based on a configuration indication in the group DCI indicating the configured grant configuration.

In some examples, the UE 115 may communicate the data transmission to the base station 105, for example, on a carrier corresponding to the serving cell identifier. In some examples, receiving the control signaling may include the UE 115 receiving the control signaling that indicates a starting position indicator. The configuration indication may be identified for the UE 115 within the group DCI based on the starting position indicator. The UE 115 may decode the group DCI corresponding to the starting position indicator to obtain at least one parameter. The data transmission may be transmitted based on the at least one parameter. In other examples, the UE 115 may receive control signaling that indicates a transmit power control command, and the data transmission may be transmitted by the UE 115 based on the transmit power control command. The UE 115 may alternatively receive control signaling that indicates a transmit power control command and the configuration indication may include an index corresponding to the configured grant configuration to use for the data transmission.

The operations performed by the base station 105 and the UE 115 as part of, but not limited to, the process flow 700 may provide improvements to wireless communications. Further, the operations performed by the base station 105 and the UE 115 as part of, but not limited to, the process flow 700 may provide benefits and enhancements to the operation of the UE 115 For example, by supporting group scheduling applications, the operational characteristics, such as power consumption may be reduced. The operations performed by the base station 105 and the UE 115 as part of, but not limited to, the process flow 700 may also provide efficiency to the UE 115 by reducing latency associated with processes related to high reliability and low latency communications and group scheduling applications.

Figure 8:
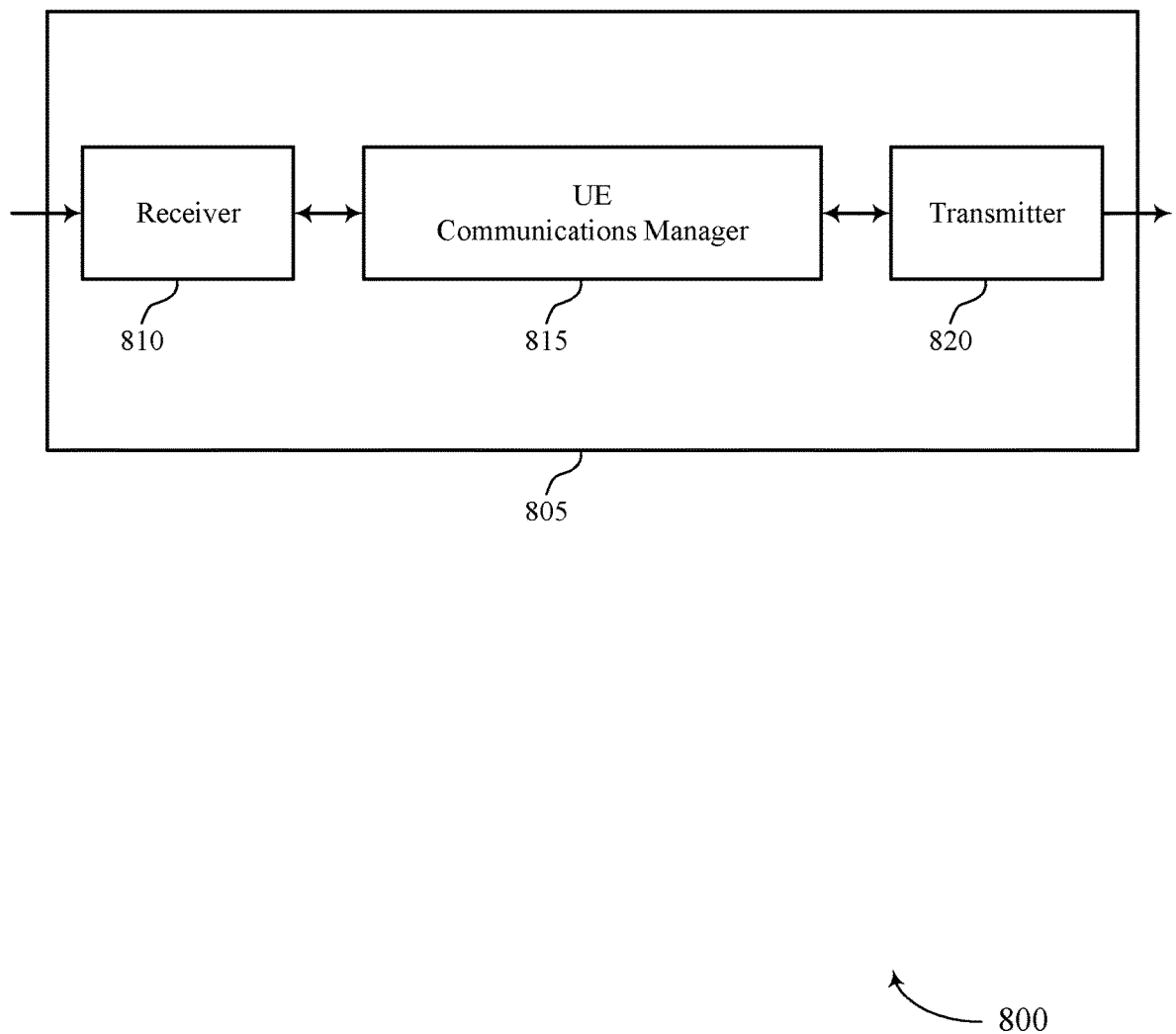
FIGS. 8 and 9 show block diagrams of devices that support group scheduling applications in accordance with aspects of the present disclosure.

FIG. 8 shows a block diagram 800 of a device 805 that supports group scheduling applications in accordance with aspects of the present disclosure. The device 805 may be an example of aspects of a UE 115 as described herein. The device 805 may include a receiver 810, a UE communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to group scheduling applications, etc.). Information may be passed on to other components of the device 805. The receiver 810 may be an example of aspects of the transceiver 1120 described with reference to FIG. 11. The receiver 810 may utilize a single antenna or a set of antennas.

The UE communications manager 815 may receive control signaling that configures the UE with a set of configured grant configurations, receive, via a group control channel, group DCI for a set of UEs that includes the UE, and communicate a data transmission in accordance with a first configured grant configuration of the set of configured grant configurations based on a configuration indication in the group DCI indicating the first configured grant configuration. The UE communications manager 815 may be an example of aspects of the UE communications manager 1110 described herein. The actions performed by the UE communications manager 815 as described herein may be implemented to realize one or more potential advantages. For example, a UE 115 may receive group-based control signaling to communicate a data transmission to a base station 105 are configured at the UE 115. Thus, techniques such as those discussed herein may allow for efficient configured grant configuration that may help reduce power consumption and enhance overall system throughput in a wireless communication system. Implementing group-based control signaling may provide improved quality and reliability of service at the UE 115, as power consumption and the number of separate resources allocated to the UE 115 may be reduced.

The UE communications manager 815, or its sub-components, may be implemented in hardware, code (e.g., software or firmware) executed by a processor, or any combination thereof. If implemented in code executed by a processor, the functions of the UE communications manager 815, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The UE communications manager 815, or its sub-components, may be physically located at various positions, including being distributed such that portions of functions are implemented at different physical locations by one or more physical components. In some examples, the UE communications manager 815, or its sub-components, may be a separate and distinct component in accordance with various aspects of the present disclosure. In some examples, the UE communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
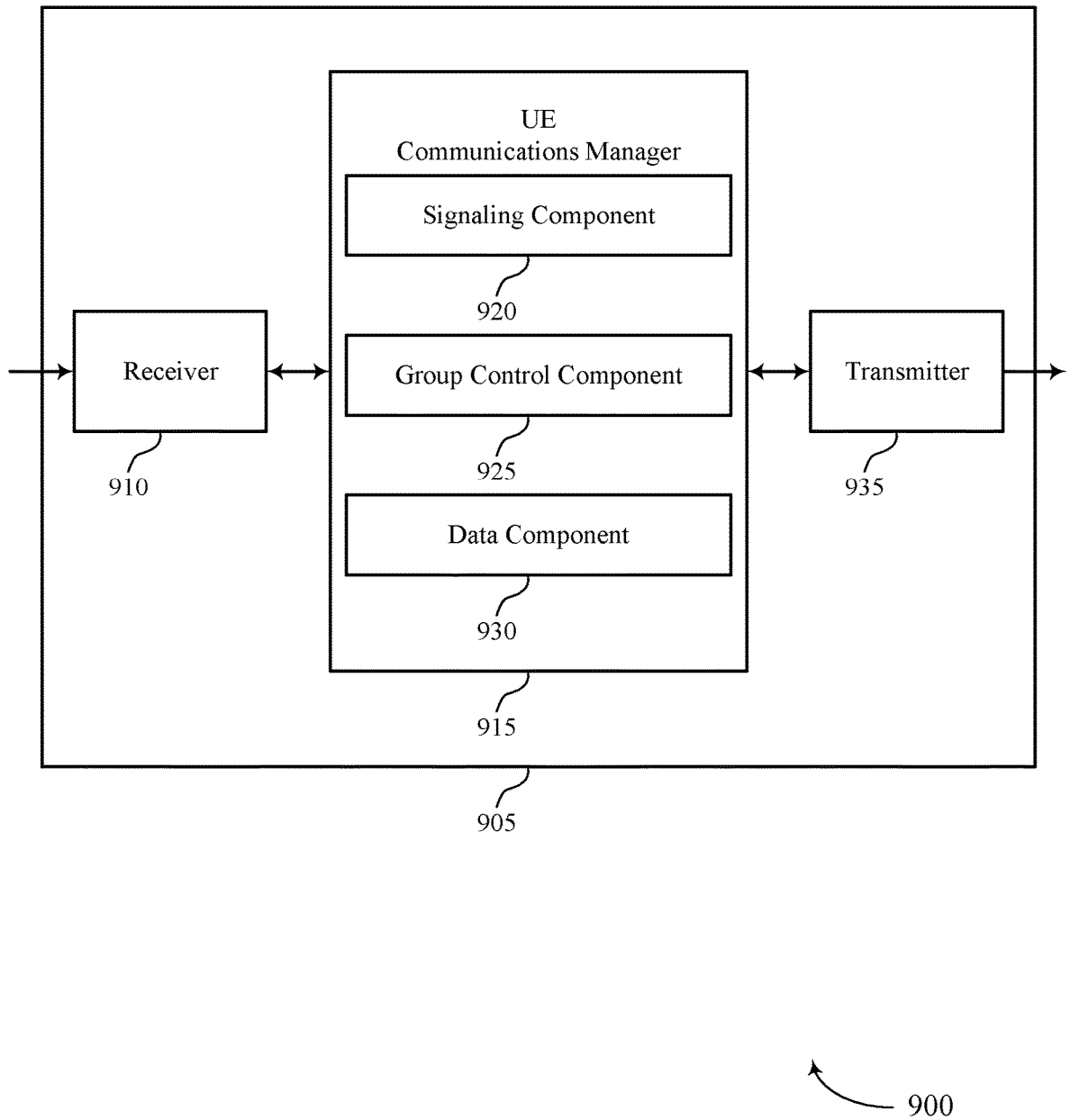

FIG. 9 shows a block diagram 900 of a device 905 that supports group scheduling applications in accordance with aspects of the present disclosure. The device 905 may be an example of aspects of a device 805, or a UE 115 as described herein. The device 905 may include a receiver 910, a UE communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to group scheduling applications, etc.). Information may be passed on to other components of the device 905. The receiver 910 may be an example of aspects of the transceiver 1120 described with reference to FIG. 11. The receiver 910 may utilize a single antenna or a set of antennas.

The UE communications manager 915 may be an example of aspects of the UE communications manager 815 as described herein. The UE communications manager 915 may include a signaling component 920, a group control component 925, and a data component 930. The UE communications manager 915 may be an example of aspects of the UE communications manager 1110 described herein.

The signaling component 920 may receive control signaling that configures the UE with a set of configured grant configurations. The group control component 925 may receive, via a group control channel, group DCI for a set of UEs that includes the UE. The data component 930 may communicate a data transmission in accordance with a first configured grant configuration of the set of configured grant configurations based on a configuration indication in the group DCI indicating the first configured grant configuration. Based on control signaling that configures the UE with a set of configured grant configurations, a processor of a UE 115 (e.g., controlling the receiver 910, the transmitter 935, or the transceiver 1120 as described with reference to FIG. 11) may efficiently communicate a data transmission in accordance with a first configured grant configuration of the set of configured grant configurations based on a configuration indication in the group DCI indicating the first configured grant configuration. The processor of the UE 115 may turn on one or more processing units for receiving the control signaling, increase a processing clock, or a similar mechanism within the UE 115. As such, when the control signaling is received, the processor may be ready to respond more efficiently through the reduction of a ramp up in processing power.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
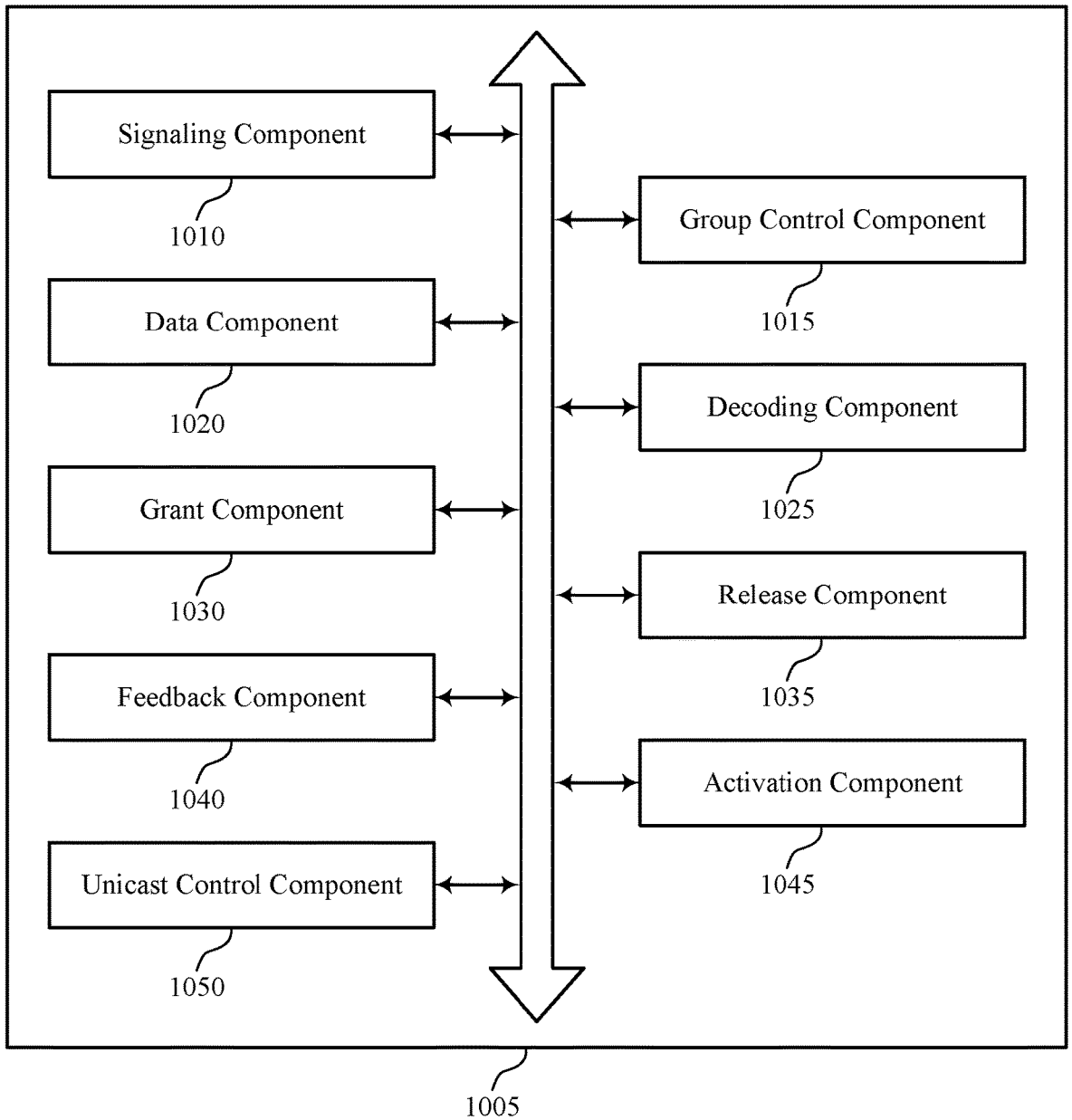
FIG. 10 shows a block diagram of a UE communications manager that supports group scheduling applications in accordance with aspects of the present disclosure.

FIG. 10 shows a block diagram 1000 of a UE communications manager 1005 that supports group scheduling applications in accordance with aspects of the present disclosure. The UE communications manager 1005 may be an example of aspects of a UE communications manager 815, a UE communications manager 915, or a UE communications manager 1110 described herein. The UE communications manager 1005 may include a signaling component 1010, a group control component 1015, a data component 1020, a decoding component 1025, a grant component 1030, a release component 1035, a feedback component 1040, an activation component 1045, and an unicast control component 1050. Each of these modules may communicate, directly or indirectly, with one another (e.g., via one or more buses).

The signaling component 1010 may receive control signaling that configures the UE with a set of configured grant configurations. In some examples, the signaling component 1010 may receive the control signaling that indicates a group identifier assigned to the set of UEs, where the group DCI is received based on the group identifier. In some examples, the signaling component 1010 may receive the control signaling that indicates a payload size for the group DCI, where the group DCI is received based on the payload size. In some examples, the signaling component 1010 may receive the control signaling that indicates a serving cell identifier, where the data transmission is communicated on a carrier corresponding to the serving cell identifier. In some examples, the signaling component 1010 may receive the control signaling that indicates a starting position indicator, where the configuration indication is identified for the UE within the group DCI based on the starting position indicator. In some examples, the signaling component 1010 may receive the control signaling that indicates a transmit power control command, where the data transmission is transmitted based on the transmit power control command. In some examples, receiving the control signaling that indicates a transmit power control command and the configuration indication includes an index corresponding to the first configured grant configuration. In some cases, the configuration indication includes an index corresponding to the first configured grant configuration.

The signaling component 1010 may receive RRC signaling that indicates, for the UE, a first delay between reception of a downlink grant and a downlink data reception corresponding to the downlink grant, a second delay between the data reception and feedback transmission for the data reception, a third delay between reception of an uplink grant and an uplink data transmission corresponding to the uplink grant, or any combination thereof. The signaling component 1010 may receive DCI including a per UE bit field that indicates a first delay between reception of a downlink grant and a downlink data reception corresponding to the downlink grant, a second delay between the data reception and feedback transmission for the data reception, a third delay between reception of an uplink grant and an uplink data transmission corresponding to the uplink grant, or any combination thereof. The signaling component 1010 may receive RRC signaling that indicates a resource of a control channel for feedback transmission by the UE. The signaling component 1010 may receive a bit-map in DCI that indicates which resource of a plurality of different resources from a control channel the UE is to use for feedback transmission. The signaling component 1010 may receive RRC signaling that indicates the plurality of different resources. The signaling component 1010 may receive a control message that indicates a subset of the plurality of different resources, where the DCI indicates which resource from the subset of the plurality of different resources the UE is to use for feedback transmission.

The group control component 1015 may receive, via a group control channel, group DCI for a set of UEs that includes the UE. In some examples, receiving the group DCI that includes a status indication that indicates that a first configured grant activated by the first configured grant configuration is for an initial transmission or a retransmission. In some examples, receiving control signaling that indicates the group DCI includes a HARQ field. In some examples, the group control component 1015 may receive control signaling that indicates the group DCI does not include a HARQ field. In some examples, the group control component 1015 may receive second group DCI that releases a first configured grant corresponding to the first configured grant configuration subsequent to communicating the data transmission.

In some examples, the group control component 1015 may receive unicast DCI that activates the first configured grant corresponding to the first configured grant configuration subsequent to receiving the unicast DCI. In some examples, the group control component 1015 may receive second group DCI that releases a semi-persistent resource corresponding to the first configured grant configuration. In some examples, the group control component 1015 may transmit an acknowledgement for the second group DCI in a resource of the group control channel that is RRC configured for the UE or indicated by UE-specific DCI within the second group DCI. In some cases, the group DCI indicates to release a first configured grant corresponding to the first configured grant configuration subsequent to communicating the data transmission. In some cases, the group DCI activates a semi-persistent resource or an uplink configured grant resource for a single initial transmission. In some cases, a HARQ field of the group DCI indicates a HARQ process that is scheduled.

The group control component 1015 may receive the DCI that includes an indication for the plurality of UEs indicating a first delay between reception of a downlink grant and a downlink data reception corresponding to the downlink grant, a second delay between the data reception and feedback transmission for the data reception, a third delay between reception of an uplink grant and an uplink data transmission corresponding to the uplink grant, or any combination thereof.

The data component 1020 may communicate a data transmission in accordance with a first configured grant configuration of the set of configured grant configurations based on a configuration indication in the group DCI indicating the first configured grant configuration. The decoding component 1025 may decode the group DCI corresponding to the starting position indicator to obtain at least one parameter, where the data transmission is transmitted based on the at least one parameter. The grant component 1030 may identify that a first configured grant activated by the first configured grant configuration is for an initial transmission or a retransmission. In some examples, the grant component 1030 may identify that the first configured grant activated by the first configured grant configuration is for the initial transmission based on acknowledging a preceding transmission. In some examples, the grant component 1030 may identify that the first configured grant activated by the first configured grant configuration is for the retransmission based on negatively acknowledging a preceding transmission. In some cases, a first configured grant corresponding to the first configured grant configuration remains active for one or more additional initial data transmissions until a release indicator is received.

The release component 1035 may release a first dynamic grant or a first configured grant corresponding to the first configured grant configuration based on the data transmission being a retransmission. The feedback component 1040 may determine a feedback identifier corresponding to the data transmission that is a retransmission. In some examples, the feedback component 1040 may start a timer for the feedback identifier corresponding to the data transmission that is the retransmission. In some cases, the feedback identifier is determined based on a prior feedback identifier. In some cases, the feedback identifier is determined based on a feedback identifier field in DCI for the UE within the group DCI. The feedback identifier may be a HARQ identifier.

The activation component 1045 may determine that the group DCI activates a semi-persistent resource or an uplink configured grant resource for a single initial transmission based on the control signaling indicating that the group DCI includes the HARQ field. In some examples, the activation component 1045 may determine that the group DCI activates a semi-persistent resource or an uplink configured grant resource for multiple transmissions based on the control signaling indicating that the group DCI does not include the HARQ field.

The unicast control component 1050 may receive unicast DCI that deactivates a first configured grant corresponding to the first configured grant configuration subsequent to communicating the data transmission. In some examples, the unicast control component 1050 may receive second group DCI that activates the first configured grant corresponding to the first configured grant configuration subsequent to receiving the unicast DCI. In some examples, receiving unicast DCI that includes a first grant, the unicast DCI at least partially overlapping in time with the group DCI that includes a second grant, where the data transmission is communicated in accordance with the first grant based on a number of symbols between a last symbol of a control channel that transports the unicast DCI and a first symbol indicated in the first grant or the second grant satisfies a threshold.

In some examples, receiving unicast DCI that includes a first grant, the unicast DCI at least partially overlapping in time with the group DCI that includes a second grant, where the data transmission is communicated in accordance with the first grant based on a last symbol of the group control channel that transports the group DCI ending after a last symbol of a second control channel that transports the unicast DCI. In some examples, receiving unicast DCI that includes a first grant, the unicast DCI at least partially overlapping in time with the group DCI that includes a second grant. In some examples, the unicast control component 1050 may identify an error based on a number of symbols between a last symbol of a control channel that transports the unicast DCI and a first symbol indicated in the first grant, or the second grant not satisfying a threshold or based on a last symbol of the group control channel that transports the group DCI not ending after a last symbol of a second control channel that transports the unicast DCI, or both.

Figure 11:
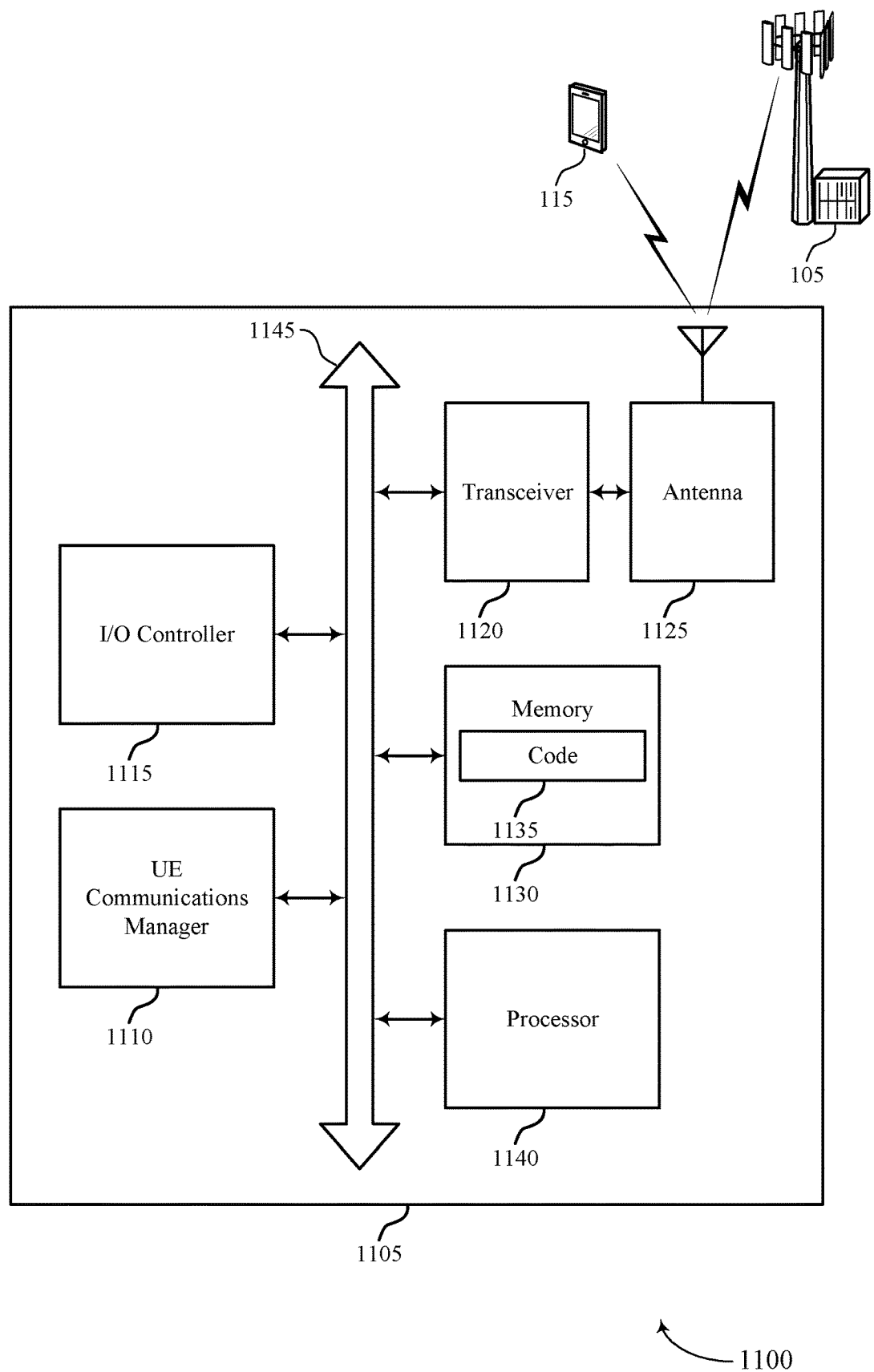
FIG. 11 shows a diagram of a system including a device that supports group scheduling applications in accordance with aspects of the present disclosure.

FIG. 11 shows a diagram of a system 1100 including a device 1105 that supports group scheduling applications in accordance with aspects of the present disclosure. The device 1105 may be an example of or include the components of device 805, device 905, or a UE 115 as described herein. The device 1105 may include components for bi-directional voice and data communications including components for transmitting and receiving communications, including a UE communications manager 1110, an I/O controller 1115, a transceiver 1120, an antenna 1125, memory 1130, and a processor 1140. These components may be in electronic communication via one or more buses (e.g., bus 1145).

The UE communications manager 1110 may receive control signaling that configures the UE with a set of configured grant configurations, receive, via a group control channel, group DCI for a set of UEs that includes the UE, and communicate a data transmission in accordance with a first configured grant configuration of the set of configured grant configurations based on a configuration indication in the group DCI indicating the first configured grant configuration.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS, ANDROID, MS-DOS, MS-WINDOWS, OS/2, UNIX, LINUX, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas. In some cases, the device 1105 may include a single antenna 1125. However, in some cases the device 1105 may have more than one antenna 1125, which may be capable of concurrently transmitting or receiving multiple wireless transmissions.

The memory 1130 may include random-access memory (RAM) and read-only memory (ROM). The memory 1130 may store a computer-readable, computer-executable code 1135 including instructions that, when executed, cause the processor to perform various functions described herein. In some cases, the memory 1130 may contain, among other things, a basic I/O system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting group scheduling applications).

The computer-readable, computer-executable code 1135 may include instructions to implement aspects of the present disclosure, including instructions to support wireless communications. The computer-readable, computer-executable code 1135 may be stored in a non-transitory computer-readable medium such as system memory or other type of memory. In some cases, the computer-readable, computer-executable code 1135 may not be directly executable by the processor 1140 but may cause a computer (e.g., when compiled and executed) to perform functions described herein.

Figure 12:
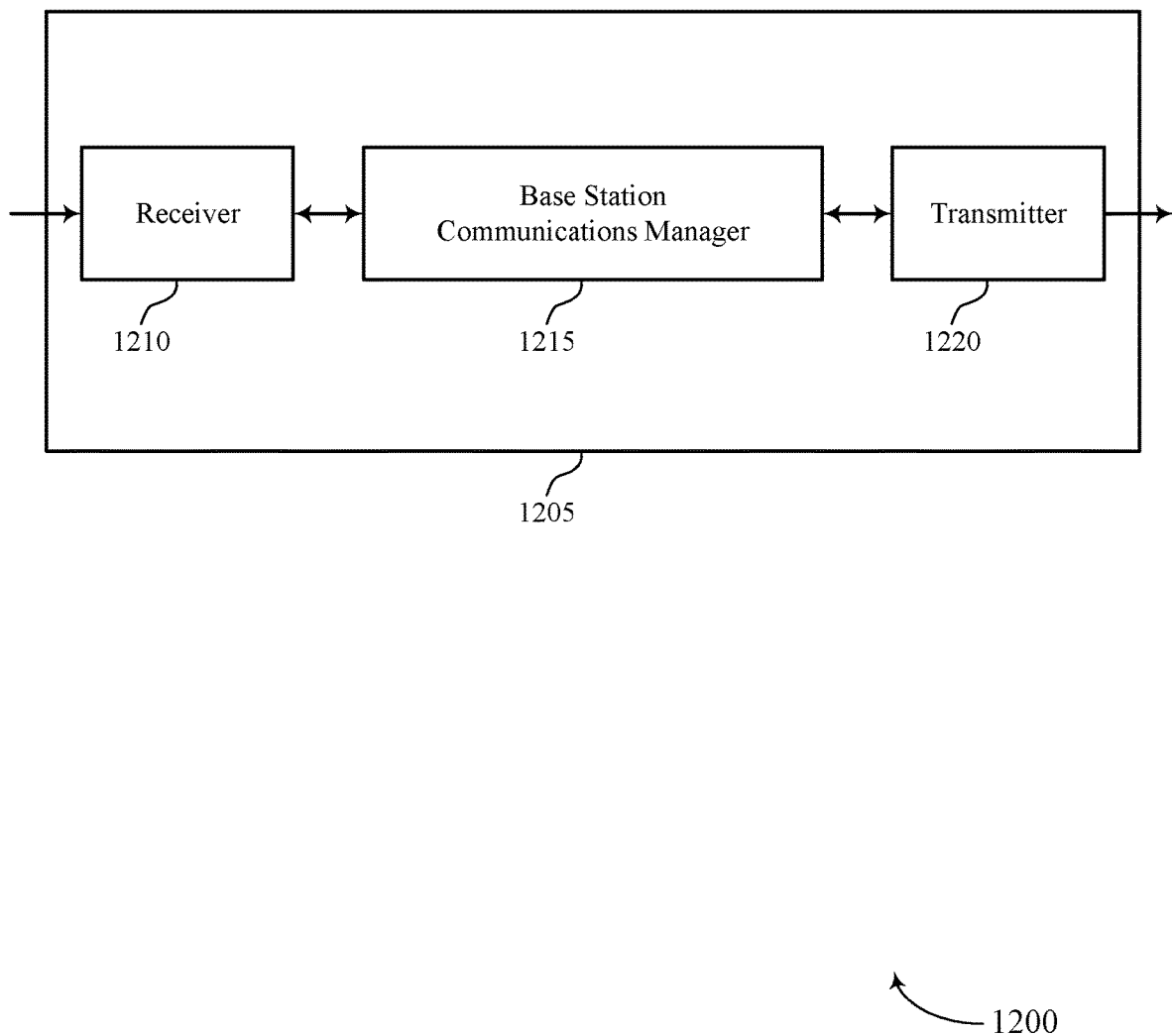
FIGS. 12 and 13 show block diagrams of devices that support group scheduling applications in accordance with aspects of the present disclosure.

FIG. 12 shows a block diagram 1200 of a device 1205 that supports group scheduling applications in accordance with aspects of the present disclosure. The device 1205 may be an example of aspects of a base station 105 as described herein. The device 1205 may include a receiver 1210, a base station communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to group scheduling applications, etc.). Information may be passed on to other components of the device 1205. The receiver 1210 may be an example of aspects of the transceiver 1520 described with reference to FIG. 15. The receiver 1210 may utilize a single antenna or a set of antennas.

The base station communications manager 1215 may transmit control signaling that configures a UE with a set of configured grant configurations, transmit, via a group control channel, group DCI (e.g., GC-DCI) for a set of UEs that includes the UE, and communicate, to the UE, a data transmission in accordance with a first configured grant configuration of the set of configured grant configurations based on a configuration indication for the UE in the group DCI indicating the first configured grant configuration. The base station communications manager 1215 may be an example of aspects of the base station communications manager 1510 described herein.

The actions performed by the base station communications manager 1215 as described herein may be implemented to realize one or more potential advantages. For example, a base station may implement group-based control signaling to configure a group of UEs 115 with a set of configured grant configurations and may communicate with the UEs 115 based on the configuration. Thus, techniques such as discussed herein may allow for efficient group scheduling that may help reduce latency and enhance overall system throughput in a wireless communication system. Implementing group-based configured grant configurations may provide improved quality and reliability of service at the base station 105, as latency and power consumption may be reduced. The base station communications manager 1215, or its sub-components, may be implemented in hardware, code (e.g., software or firmware) executed by a processor, or any combination thereof. If implemented in code executed by a processor, the functions of the base station communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 1215, or its sub-components, may be physically located at various positions, including being distributed such that portions of functions are implemented at different physical locations by one or more physical components. In some examples, the base station communications manager 1215, or its sub-components, may be a separate and distinct component in accordance with various aspects of the present disclosure. In some examples, the base station communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
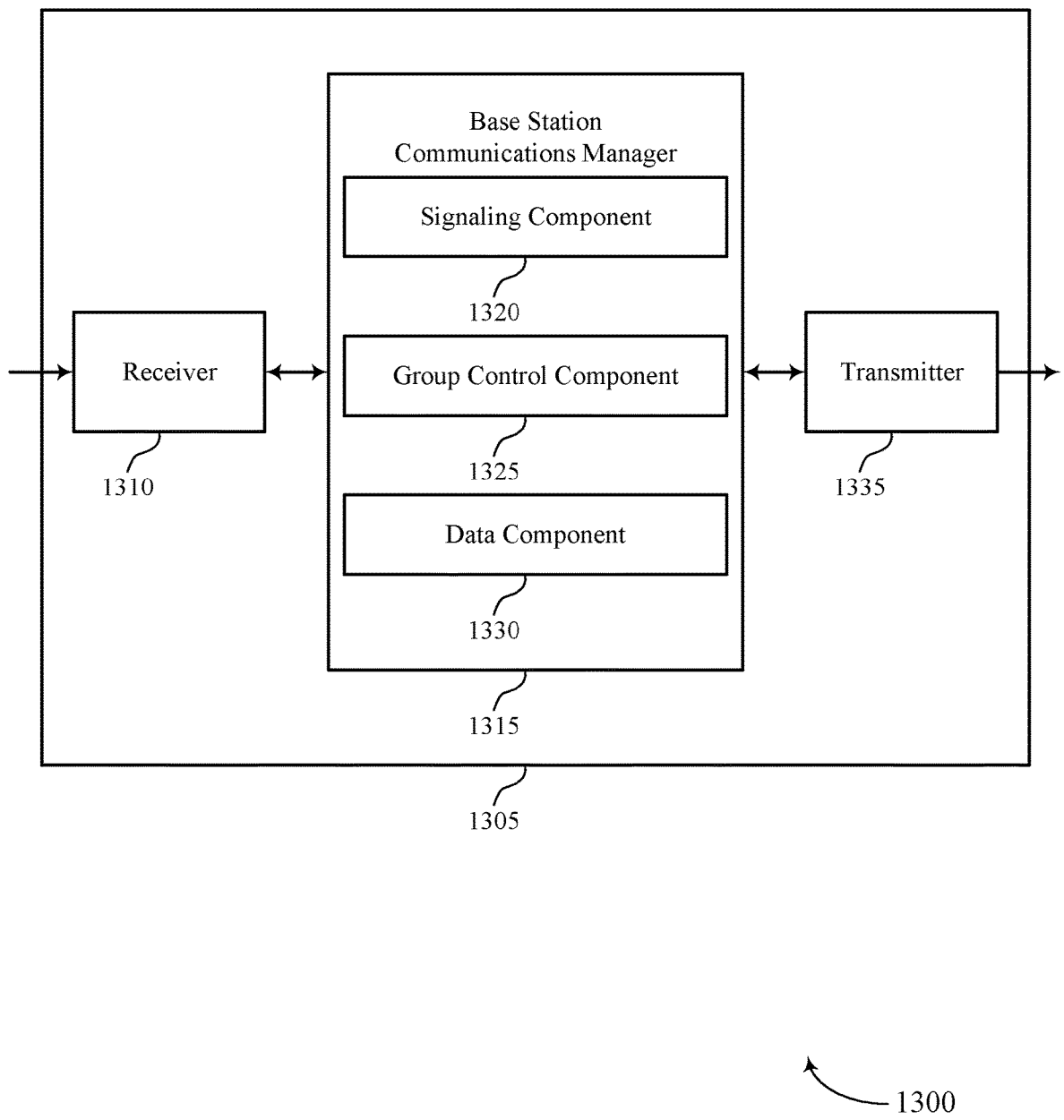

FIG. 13 shows a block diagram 1300 of a device 1305 that supports group scheduling applications in accordance with aspects of the present disclosure. The device 1305 may be an example of aspects of a device 1205, or a base station 105 as described herein. The device 1305 may include a receiver 1310, a base station communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to group scheduling applications, etc.). Information may be passed on to other components of the device 1305. The receiver 1310 may be an example of aspects of the transceiver 1520 described with reference to FIG. 15. The receiver 1310 may utilize a single antenna or a set of antennas.

The base station communications manager 1315 may be an example of aspects of the base station communications manager 1215 as described herein. The base station communications manager 1315 may include a signaling component 1320, a group control component 1325, and a data component 1330. The base station communications manager 1315 may be an example of aspects of the base station communications manager 1510 described herein.

The signaling component 1320 may transmit control signaling that configures a UE with a set of configured grant configurations. The group control component 1325 may transmit, via a group control channel, group DCI for a set of UEs that includes the UE. The data component 1330 may communicate, to the UE, a data transmission in accordance with a first configured grant configuration of the set of configured grant configurations based on a configuration indication for the UE in the group DCI indicating the first configured grant configuration. Based on transmitting the group DCI for the set of UEs, a processor of a base station 105 (e.g., controlling the receiver 1310, the transmitter 1335, or the transceiver 1520 as described with reference to FIG. 15) may efficiently communicate the data transmission to a UE 115. The processor of the base station 105 may turn on one or more processing units for transmitting the control signaling that configures the UE 115 with the set of configured grant configurations, increase a processing clock, or a similar mechanism within the base station 105. As such, when the control signaling is transmitted, the processor may be ready to respond more efficiently through the reduction of a ramp up in processing power.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
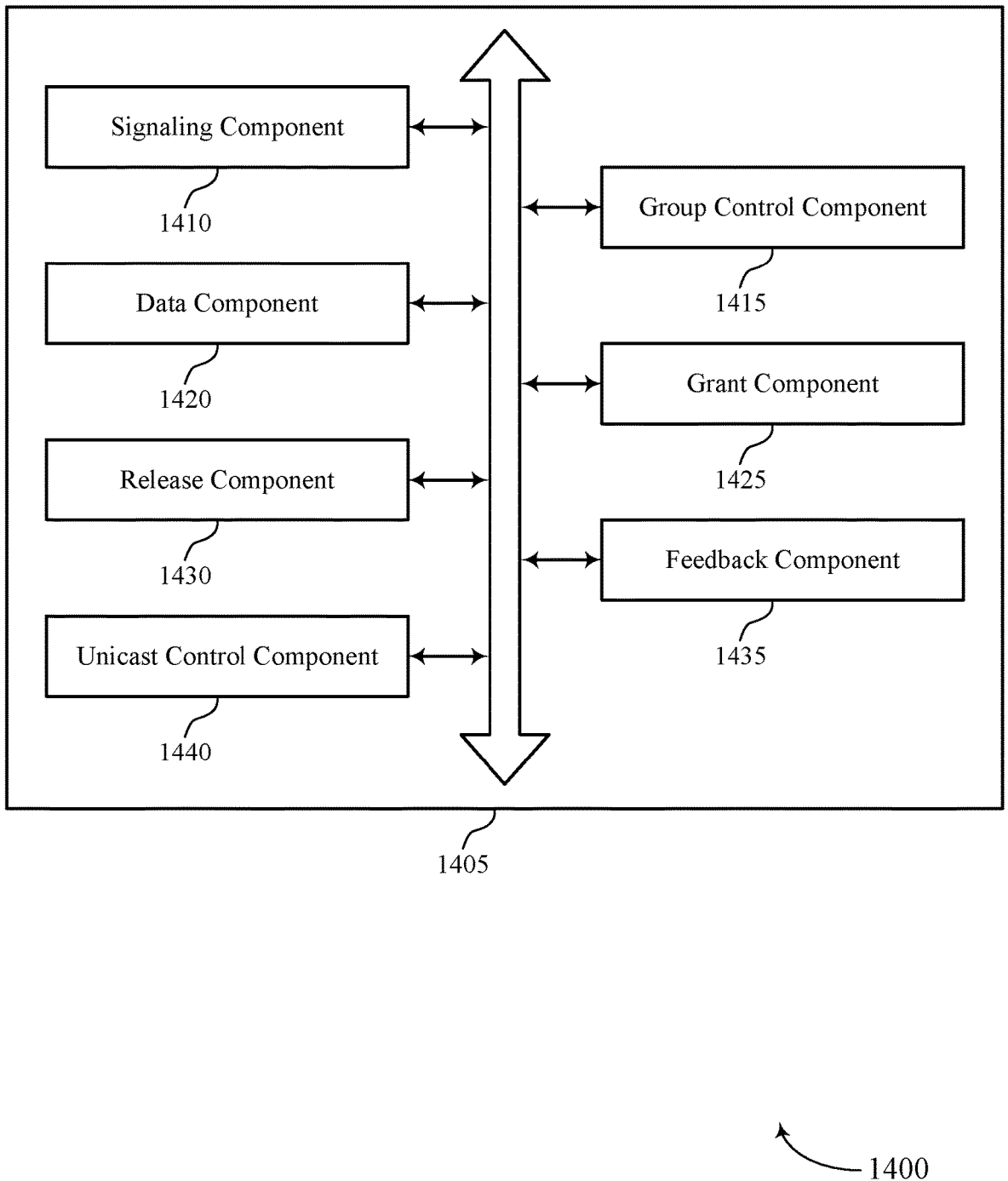
FIG. 14 shows a block diagram of a base station communications manager that supports group scheduling applications in accordance with aspects of the present disclosure.

FIG. 14 shows a block diagram 1400 of a communications manager 1405 that supports group scheduling applications in accordance with aspects of the present disclosure. The communications manager 1405 may be an example of aspects of a base station communications manager 1215, a base station communications manager 1315, or a base station communications manager 1510 described herein. The communications manager 1405 may include a signaling component 1410, a group control component 1415, a data component 1420, a grant component 1425, a release component 1430, a feedback component 1435, and an unicast control component 1440. Each of these modules may communicate, directly or indirectly, with one another (e.g., via one or more buses).

The signaling component 1410 may transmit control signaling that configures a UE with a set of configured grant configurations. In some examples, the signaling component 1410 may transmit the control signaling that indicates a group identifier assigned to the set of UEs, where the group DCI is transmitted based on the group identifier. In some examples, the signaling component 1410 may transmit the control signaling that indicates a payload size for the group DCI, where the group DCI is transmitted based on the payload size. In some examples, the signaling component 1410 may transmit the control signaling that indicates a serving cell identifier, where the data transmission is communicated on a carrier corresponding to the serving cell identifier. In some examples, the signaling component 1410 may transmit the control signaling that indicates a starting position indicator, where the configuration indication is identified for the UE within the group DCI based on the starting position indicator. In some examples, the signaling component 1410 may transmit the control signaling that indicates a transmit power control command, where the data transmission is communicated based on the transmit power control command. In some examples, transmitting the control signaling that indicates a transmit power control command and the configuration indication includes an index corresponding to the first configured grant configuration. In some cases, the configuration indication includes an index corresponding to the first configured grant configuration.

The group control component 1415 may transmit, via a group control channel, group DCI for a set of UEs that includes the UE. In some examples, transmitting the group DCI that includes a status indication that indicates that a first configured grant activated by the first configured grant configuration is for an initial transmission or a retransmission. In some examples, transmitting control signaling that indicates the group DCI includes a HARQ field. In some examples, the group control component 1415 may transmit control signaling that indicates the group DCI does not include a HARQ field. In some examples, the group control component 1415 may transmit second group DCI that releases a first configured grant corresponding to the first configured grant configuration subsequent to communicating the data transmission. In some examples, the group control component 1415 may transmit unicast DCI that activates the first configured grant corresponding to the first configured grant configuration subsequent to receiving the unicast DCI. In some examples, the group control component 1415 may transmit second group DCI that releases a semi-persistent resource corresponding to the first configured grant configuration.

In some examples, the group control component 1415 may receive an acknowledgement for the second group DCI in a resource of the group control channel that is RRC configured for the UE or indicated by UE-specific DCI within the second group DCI. In some cases, the group DCI indicates to release a first configured grant corresponding to the first configured grant configuration subsequent to communicating the data transmission. In some cases, the group DCI activates a semi-persistent resource or an uplink configured grant resource for a single initial transmission. In some cases, a HARQ field of the group DCI indicates a HARQ process that is scheduled.

The data component 1420 may communicate, to the UE, a data transmission in accordance with a first configured grant configuration of the set of configured grant configurations based on a configuration indication for the UE in the group DCI indicating the first configured grant configuration. The grant component 1425 may identify that a first configured grant activated by the first configured grant configuration is for an initial transmission or a retransmission. In some examples, the grant component 1425 may identify that the first configured grant activated by the first configured grant configuration is for the initial transmission based on receiving an acknowledgement for a preceding transmission. In some examples, the grant component 1425 may identify that the first configured grant activated by the first configured grant configuration is for the retransmission based on receiving a negative acknowledgement for a preceding transmission. In some cases, a first configured grant corresponding to the first configured grant configuration remains active for one or more additional initial data transmissions until a release indicator is transmitted by the base station to the UE.

The release component 1430 may release a first dynamic grant or a first configured grant corresponding to the first configured grant configuration based on the data transmission being a retransmission. The feedback component 1435 may determine a feedback identifier corresponding to the data transmission that is a retransmission. In some examples, the feedback component 1435 may start a timer for the feedback identifier corresponding to the data transmission that is the retransmission. In some cases, the feedback identifier is determined based on a prior feedback identifier. In some cases, the feedback identifier is determined based on a feedback identifier field in DCI for the UE within the group DCI.

The unicast control component 1440 may transmit unicast DCI that deactivates a first configured grant corresponding to the first configured grant configuration subsequent to communicating the data transmission. In some examples, the unicast control component 1440 may transmit second group DCI that activates a first configured grant corresponding to the first configured grant configuration subsequent to transmitting the unicast DCI. In some examples, transmitting unicast DCI that includes a first grant, the unicast DCI at least partially overlapping in time with the group DCI that includes a second grant, where the data transmission is communicated in accordance with the first grant based on a number of symbols between a last symbol of a control channel that transports the unicast DCI and a first symbol indicated in the first grant or the second grant satisfies a threshold. In some examples, transmitting unicast DCI that includes a first grant, the unicast DCI at least partially overlapping in time with the group DCI that includes a second grant, where the data transmission is communicated in accordance with the first grant based on a last symbol of the group control channel that transports the group DCI ending after a last symbol of a second control channel that transports the unicast DCI.

Figure 15:
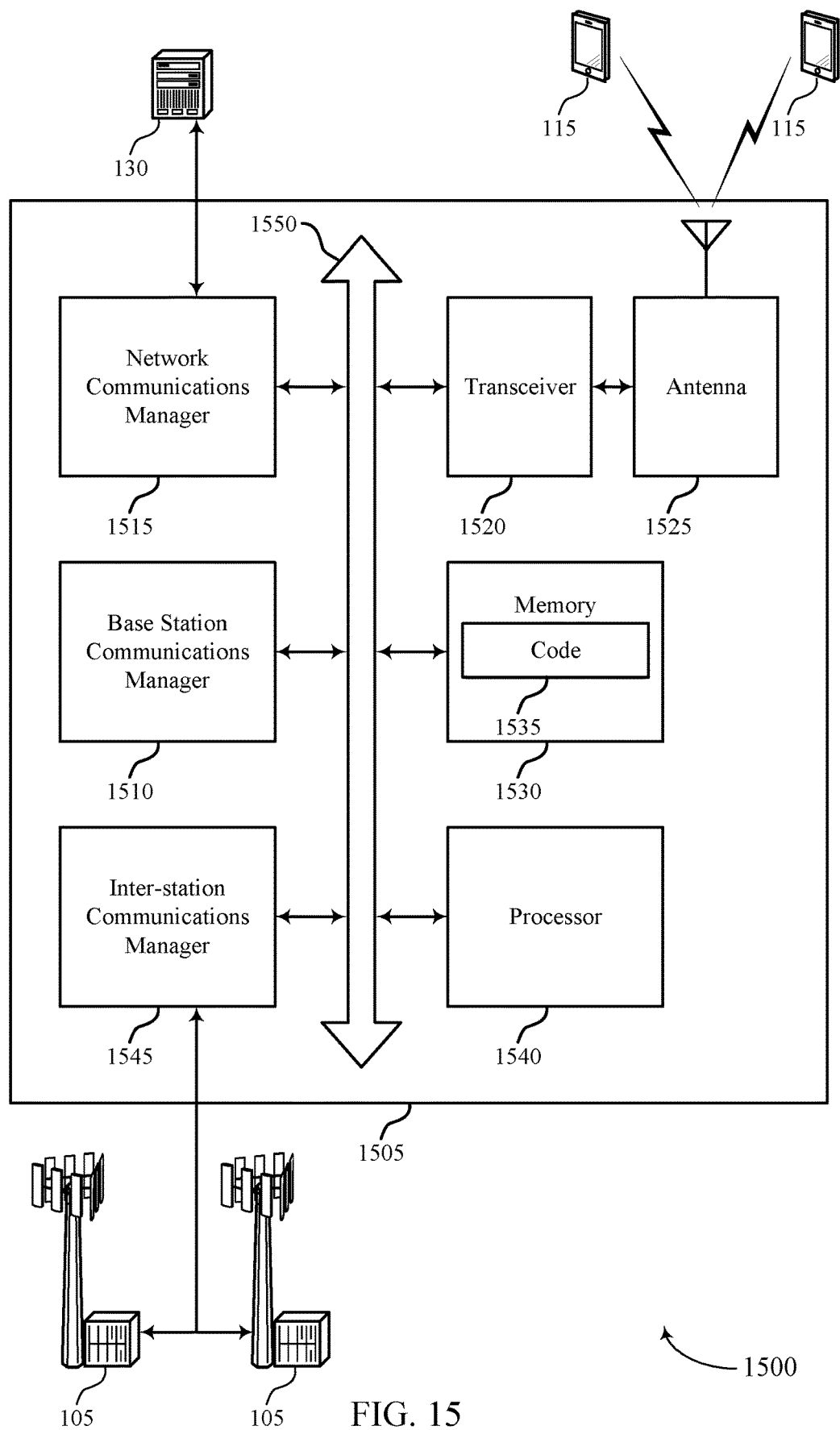
FIG. 15 shows a diagram of a system including a device that supports group scheduling applications in accordance with aspects of the present disclosure.

FIG. 15 shows a diagram of a system 1500 including a device 1505 that supports group scheduling applications in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a base station communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The base station communications manager 1510 may transmit control signaling that configures a UE with a set of configured grant configurations, transmit, via a group control channel, group DCI for a set of UEs that includes the UE, and communicate, to the UE, a data transmission in accordance with a first configured grant configuration of the set of configured grant configurations based on a configuration indication for the UE in the group DCI indicating the first configured grant configuration.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described herein. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas. In some cases, the device 1505 may include a single antenna 1525. However, in some cases the device 1505 may have more than one antenna 1525, which may be capable of concurrently transmitting or receiving multiple wireless transmissions.

The memory 1530 may include RAM, ROM, or a combination thereof. The memory 1530 may store a computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting group scheduling applications).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The computer-readable code 1535 may include instructions to implement aspects of the present disclosure, including instructions to support wireless communications. The computer-readable code 1535 may be stored in a non-transitory computer-readable medium such as system memory or other type of memory. In some cases, the computer-readable code 1535 may not be directly executable by the processor 1540 but may cause a computer (e.g., when compiled and executed) to perform functions described herein.

Figure 16:
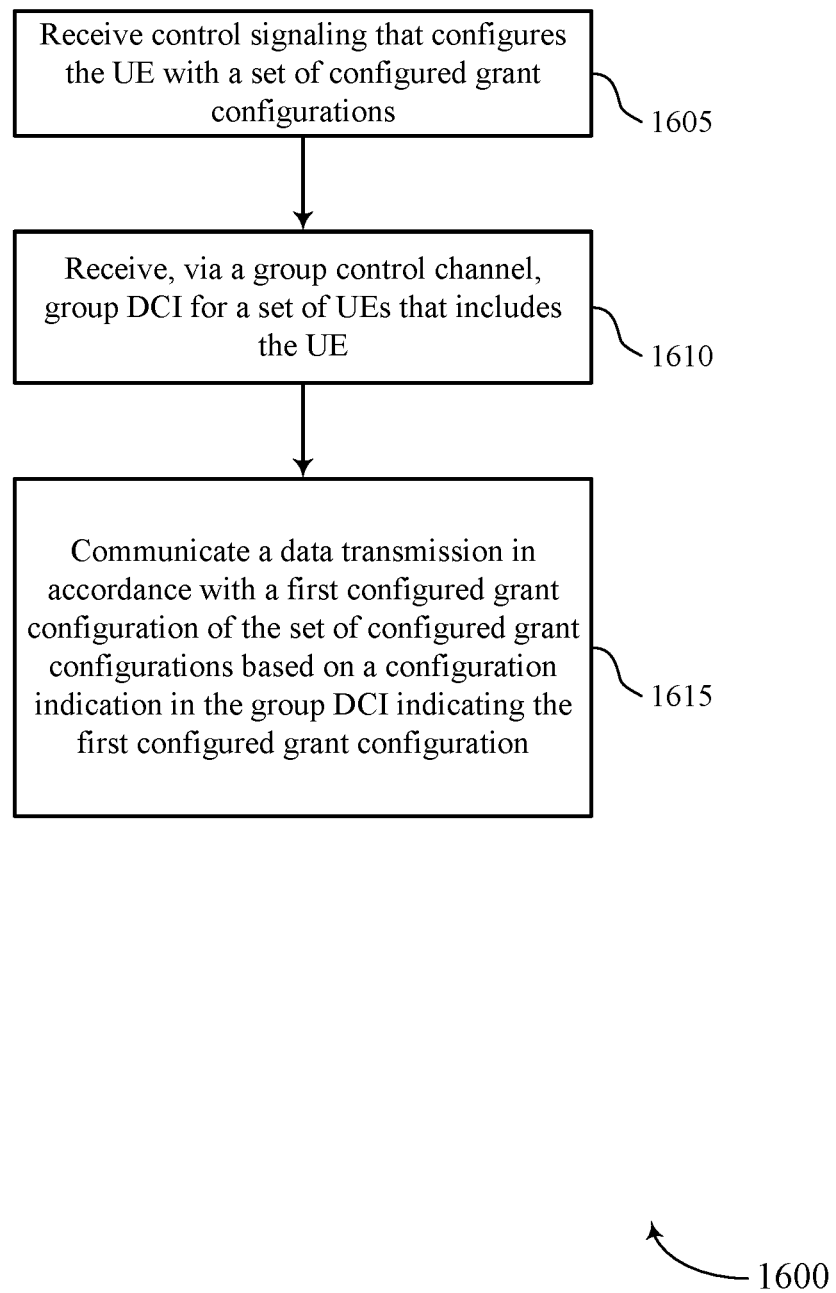
FIGS. 16 through 22 show flowcharts illustrating methods that support group scheduling applications in accordance with aspects of the present disclosure.

FIG. 16 shows a flowchart illustrating a method 1600 that supports group scheduling applications in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1605, the UE may receive control signaling that configures the UE with a set of configured grant configurations. The operations of 1605 may be performed according to the methods described herein. In some examples, aspects of the operations of 1605 may be performed by a signaling component as described with reference to FIGS. 8 through 11.

At 1610, the UE may receive, via a group control channel, group DCI for a set of UEs that includes the UE. The operations of 1610 may be performed according to the methods described herein. In some examples, aspects of the operations of 1610 may be performed by a group control component as described with reference to FIGS. 8 through 11.

At 1615, the UE may communicate a data transmission in accordance with a first configured grant configuration of the set of configured grant configurations based on a configuration indication in the group DCI indicating the first configured grant configuration. The operations of 1615 may be performed according to the methods described herein. In some examples, aspects of the operations of 1615 may be performed by a data component as described with reference to FIGS. 8 through 11.

Figure 17:
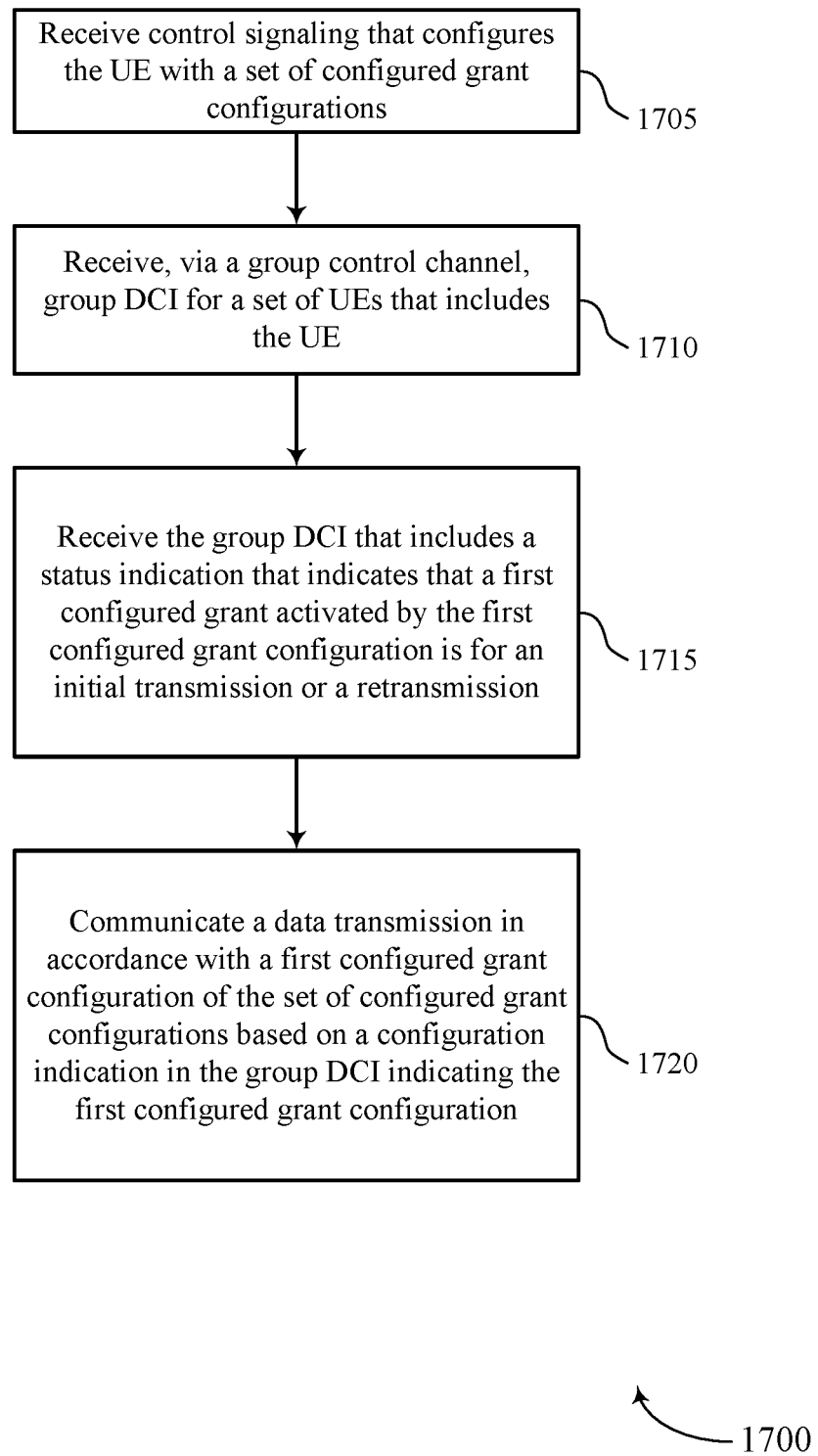

FIG. 17 shows a flowchart illustrating a method 1700 that supports group scheduling applications in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1705, the UE may receive control signaling that configures the UE with a set of configured grant configurations. The operations of 1705 may be performed according to the methods described herein. In some examples, aspects of the operations of 1705 may be performed by a signaling component as described with reference to FIGS. 8 through 11.

At 1710, the UE may receive, via a group control channel, group DCI for a set of UEs that includes the UE. The operations of 1710 may be performed according to the methods described herein. In some examples, aspects of the operations of 1710 may be performed by a group control component as described with reference to FIGS. 8 through 11.

At 1715, the UE may receive the group DCI that includes a status indication that indicates that a first configured grant activated by the first configured grant configuration is for an initial transmission or a retransmission. The operations of 1715 may be performed according to the methods described herein. In some examples, aspects of the operations of 1715 may be performed by a group control component as described with reference to FIGS. 8 through 11.

At 1720, the UE may communicate a data transmission in accordance with a first configured grant configuration of the set of configured grant configurations based on a configuration indication in the group DCI indicating the first configured grant configuration. The operations of 1720 may be performed according to the methods described herein. In some examples, aspects of the operations of 1720 may be performed by a data component as described with reference to FIGS. 8 through 11.

Figure 18:
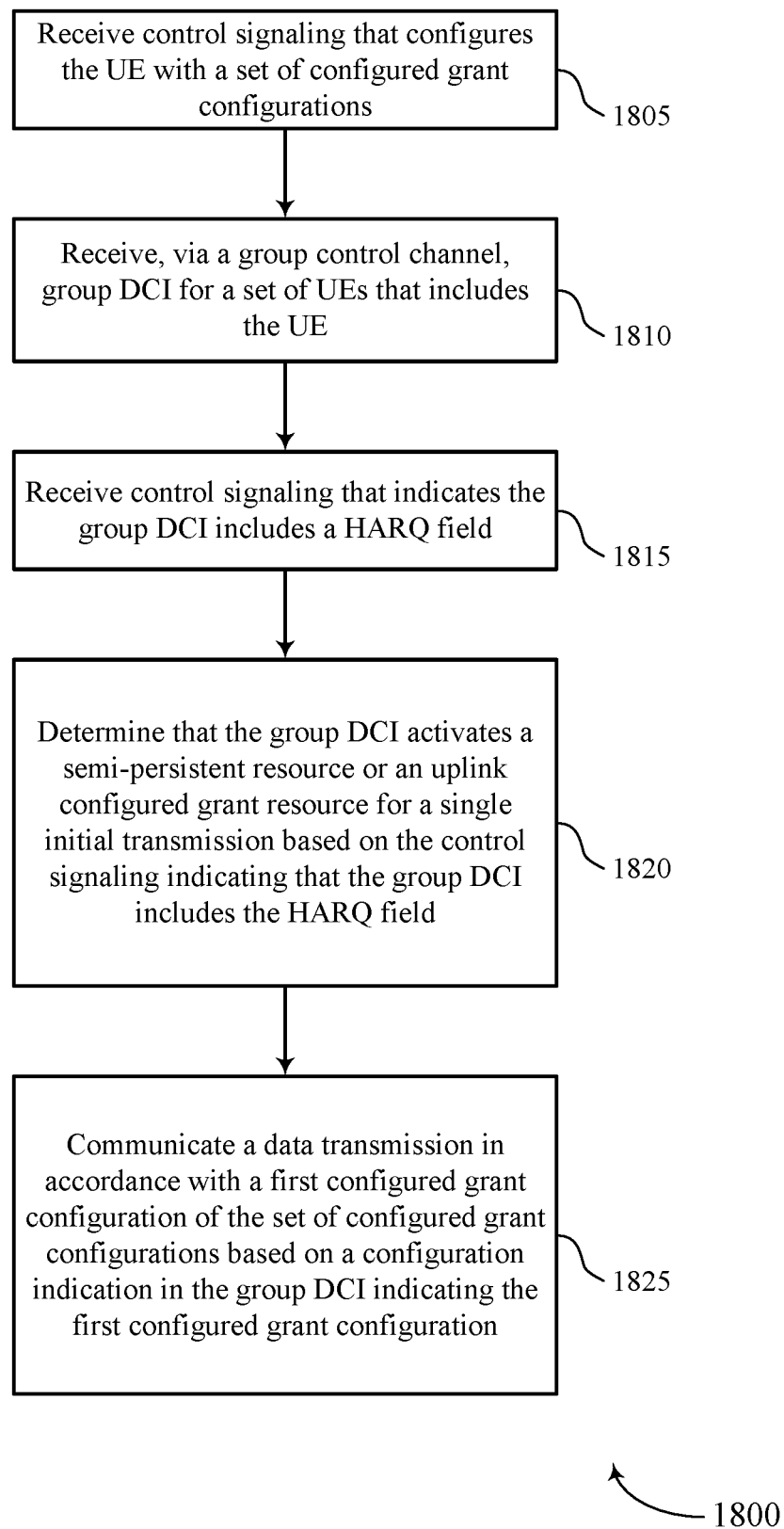

FIG. 18 shows a flowchart illustrating a method 1800 that supports group scheduling applications in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1805, the UE may receive control signaling that configures the UE with a set of configured grant configurations. The operations of 1805 may be performed according to the methods described herein. In some examples, aspects of the operations of 1805 may be performed by a signaling component as described with reference to FIGS. 8 through 11.

At 1810, the UE may receive, via a group control channel, group DCI for a set of UEs that includes the UE. The operations of 1810 may be performed according to the methods described herein. In some examples, aspects of the operations of 1810 may be performed by a group control component as described with reference to FIGS. 8 through 11.

At 1815, the UE may receive control signaling that indicates the group DCI includes a HARQ field. The operations of 1815 may be performed according to the methods described herein. In some examples, aspects of the operations of 1815 may be performed by a group control component as described with reference to FIGS. 8 through 11.

At 1820, the UE may determine that the group DCI activates a semi-persistent resource or an uplink configured grant resource for a single initial transmission based on the control signaling indicating that the group DCI includes the HARQ field. The operations of 1820 may be performed according to the methods described herein. In some examples, aspects of the operations of 1820 may be performed by an activation component as described with reference to FIGS. 8 through 11.

At 1825, the UE may communicate a data transmission in accordance with a first configured grant configuration of the set of configured grant configurations based on a configuration indication in the group DCI indicating the first configured grant configuration. The operations of 1825 may be performed according to the methods described herein. In some examples, aspects of the operations of 1825 may be performed by a data component as described with reference to FIGS. 8 through 11.

Figure 19:
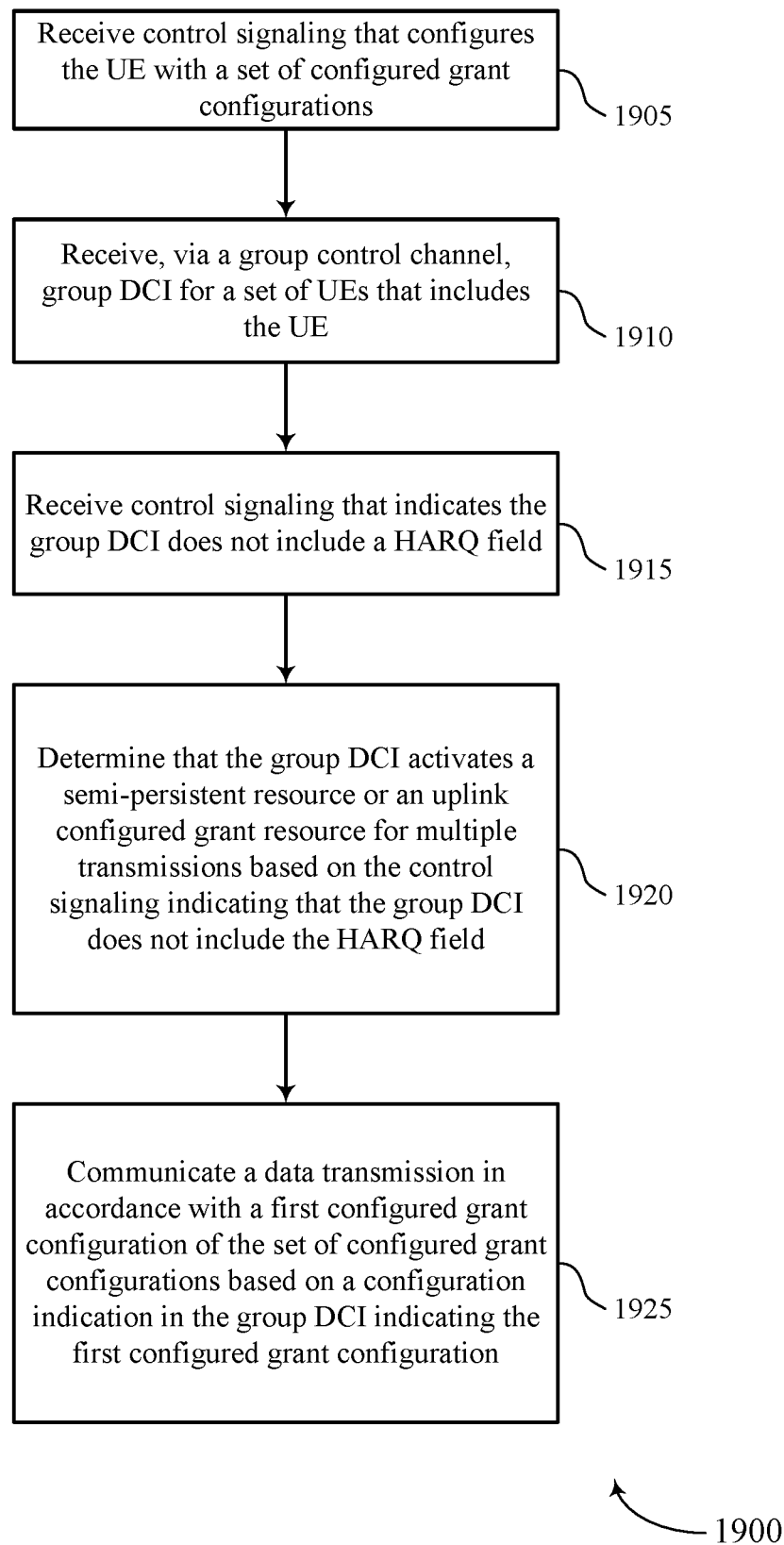

FIG. 19 shows a flowchart illustrating a method 1900 that supports group scheduling applications in accordance with aspects of the present disclosure. The operations of method 1900 may be implemented by a UE 115 or its components as described herein. For example, the operations of method 1900 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1905, the UE may receive control signaling that configures the UE with a set of configured grant configurations. The operations of 1905 may be performed according to the methods described herein. In some examples, aspects of the operations of 1905 may be performed by a signaling component as described with reference to FIGS. 8 through 11.

At 1910, the UE may receive, via a group control channel, group DCI for a set of UEs that includes the UE. The operations of 1910 may be performed according to the methods described herein. In some examples, aspects of the operations of 1910 may be performed by a group control component as described with reference to FIGS. 8 through 11.

At 1915, the UE may receive control signaling that indicates the group DCI does not include a HARQ field. The operations of 1915 may be performed according to the methods described herein. In some examples, aspects of the operations of 1915 may be performed by a group control component as described with reference to FIGS. 8 through 11.

At 1920, the UE may determine that the group DCI activates a semi-persistent resource or an uplink configured grant resource for multiple transmissions based on the control signaling indicating that the group DCI does not include the HARQ field. The operations of 1920 may be performed according to the methods described herein. In some examples, aspects of the operations of 1920 may be performed by an activation component as described with reference to FIGS. 8 through 11.

At 1925, the UE may communicate a data transmission in accordance with a first configured grant configuration of the set of configured grant configurations based on a configuration indication in the group DCI indicating the first configured grant configuration. The operations of 1925 may be performed according to the methods described herein. In some examples, aspects of the operations of 1925 may be performed by a data component as described with reference to FIGS. 8 through 11.

Figure 20:
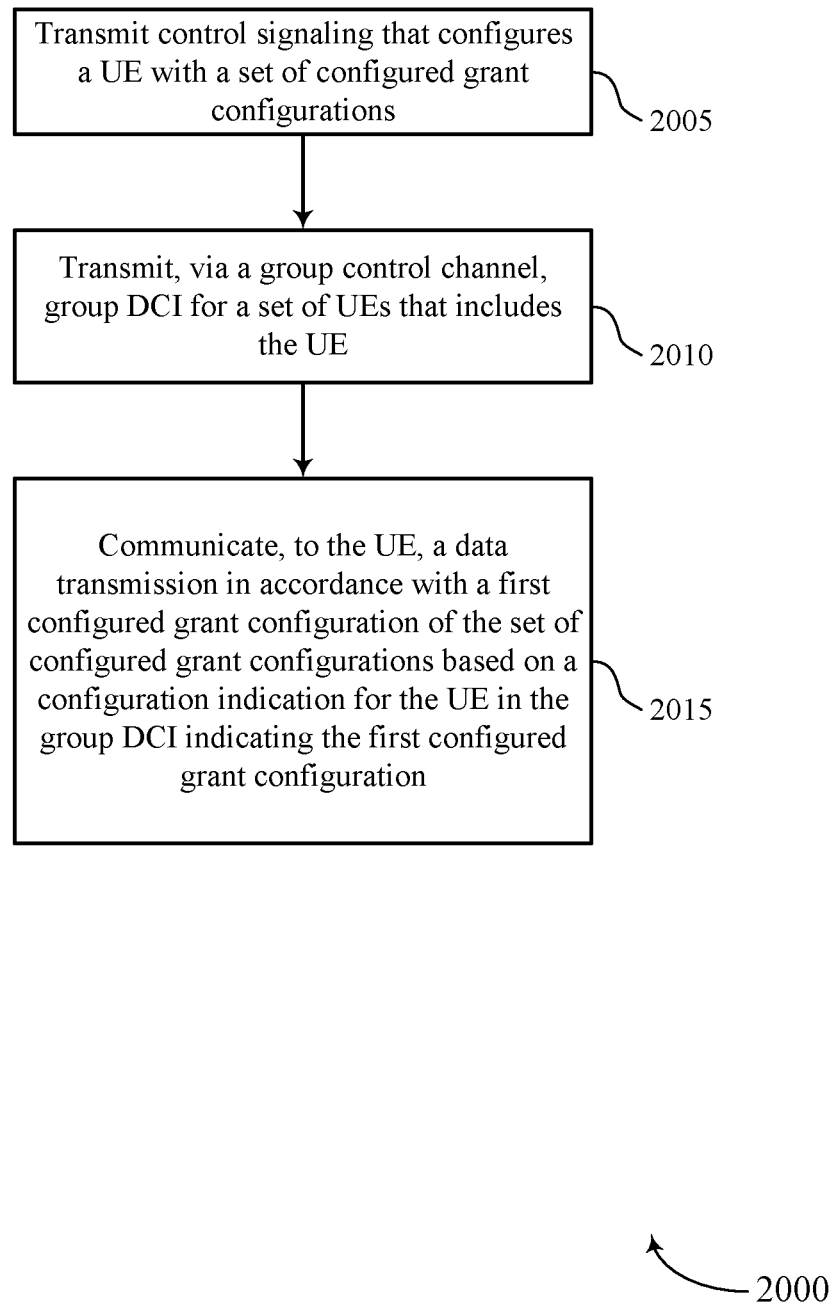

FIG. 20 shows a flowchart illustrating a method 2000 that supports group scheduling applications in accordance with aspects of the present disclosure. The operations of method 2000 may be implemented by a base station 105 or its components as described herein. For example, the operations of method 2000 may be performed by a communications manager as described with reference to FIGS. 12 through 15. In some examples, a base station may execute a set of instructions to control the functional elements of the base station to perform the functions described herein. Additionally or alternatively, a base station may perform aspects of the functions described herein using special-purpose hardware.

At 2005, the base station may transmit control signaling that configures a UE with a set of configured grant configurations. The operations of 2005 may be performed according to the methods described herein. In some examples, aspects of the operations of 2005 may be performed by a signaling component as described with reference to FIGS. 12 through 15.

At 2010, the base station may transmit, via a group control channel, group DCI for a set of UEs that includes the UE. The operations of 2010 may be performed according to the methods described herein. In some examples, aspects of the operations of 2010 may be performed by a group control component as described with reference to FIGS. 12 through 15.

At 2015, the base station may communicate, to the UE, a data transmission in accordance with a first configured grant configuration of the set of configured grant configurations based on a configuration indication for the UE in the group DCI indicating the first configured grant configuration. The operations of 2015 may be performed according to the methods described herein. In some examples, aspects of the operations of 2015 may be performed by a data component as described with reference to FIGS. 12 through 15.

Figure 21:
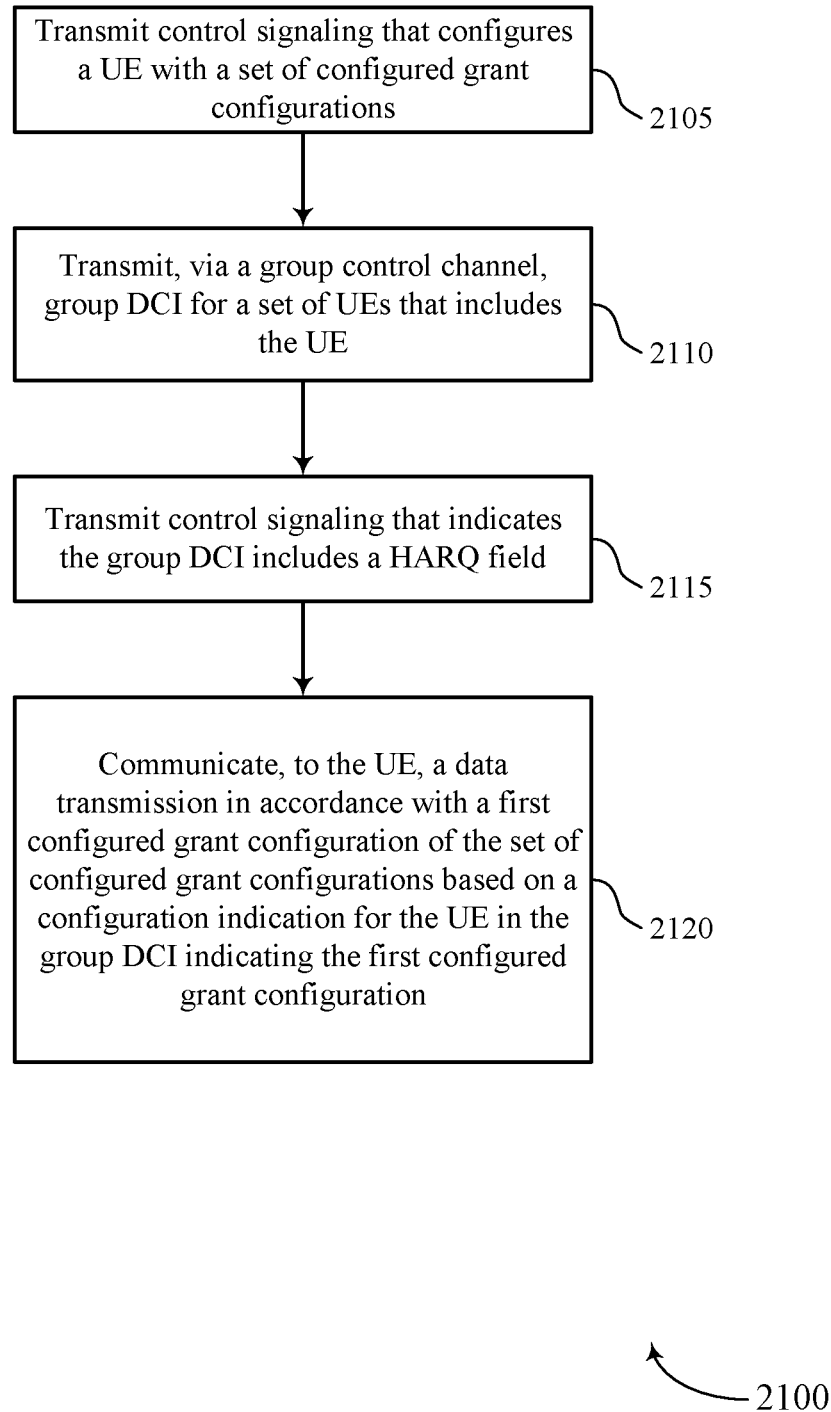

FIG. 21 shows a flowchart illustrating a method 2100 that supports group scheduling applications in accordance with aspects of the present disclosure. The operations of method 2100 may be implemented by a base station 105 or its components as described herein. For example, the operations of method 2100 may be performed by a communications manager as described with reference to FIGS. 12 through 15. In some examples, a base station may execute a set of instructions to control the functional elements of the base station to perform the functions described herein. Additionally or alternatively, a base station may perform aspects of the functions described herein using special-purpose hardware.

At 2105, the base station may transmit control signaling that configures a UE with a set of configured grant configurations. The operations of 2105 may be performed according to the methods described herein. In some examples, aspects of the operations of 2105 may be performed by a signaling component as described with reference to FIGS. 12 through 15.

At 2110, the base station may transmit, via a group control channel, group DCI for a set of UEs that includes the UE. The operations of 2110 may be performed according to the methods described herein. In some examples, aspects of the operations of 2110 may be performed by a group control component as described with reference to FIGS. 12 through 15.

At 2115, the base station may transmit control signaling that indicates the group DCI includes a HARQ field. The operations of 2115 may be performed according to the methods described herein. In some examples, aspects of the operations of 2115 may be performed by a group control component as described with reference to FIGS. 12 through 15.

At 2120, the base station may communicate, to the UE, a data transmission in accordance with a first configured grant configuration of the set of configured grant configurations based on a configuration indication for the UE in the group DCI indicating the first configured grant configuration. The operations of 2120 may be performed according to the methods described herein. In some examples, aspects of the operations of 2120 may be performed by a data component as described with reference to FIGS. 12 through 15.

Figure 22:
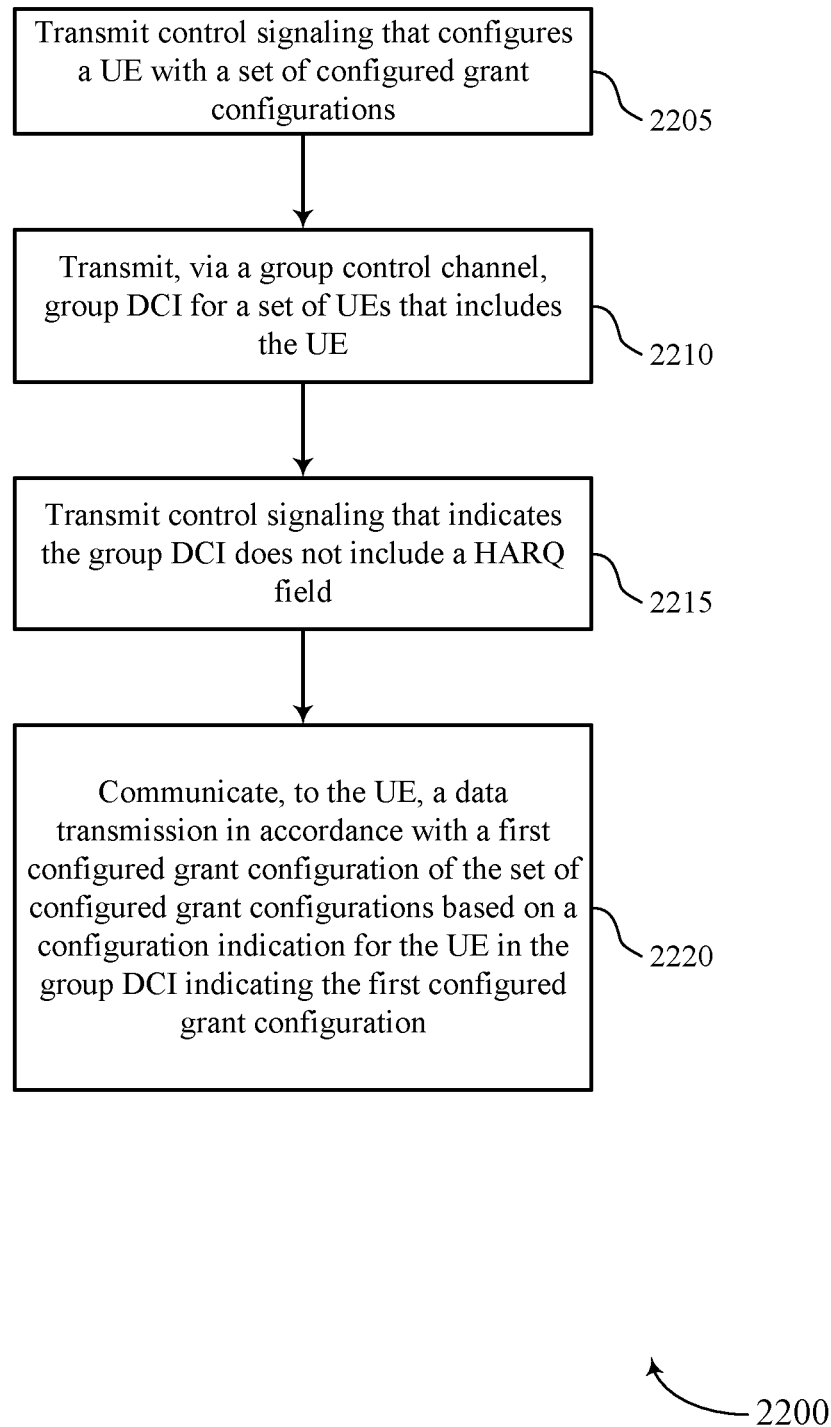

FIG. 22 shows a flowchart illustrating a method 2200 that supports group scheduling applications in accordance with aspects of the present disclosure. The operations of method 2200 may be implemented by a base station 105 or its components as described herein. For example, the operations of method 2200 may be performed by a communications manager as described with reference to FIGS. 12 through 15. In some examples, a base station may execute a set of instructions to control the functional elements of the base station to perform the functions described herein. Additionally or alternatively, a base station may perform aspects of the functions described herein using special-purpose hardware.

At 2205, the base station may transmit control signaling that configures a UE with a set of configured grant configurations. The operations of 2205 may be performed according to the methods described herein. In some examples, aspects of the operations of 2205 may be performed by a signaling component as described with reference to FIGS. 12 through 15.

At 2210, the base station may transmit, via a group control channel, group DCI for a set of UEs that includes the UE. The operations of 2210 may be performed according to the methods described herein. In some examples, aspects of the operations of 2210 may be performed by a group control component as described with reference to FIGS. 12 through 15.

At 2215, the base station may transmit control signaling that indicates the group DCI does not include a HARQ field. The operations of 2215 may be performed according to the methods described herein. In some examples, aspects of the operations of 2215 may be performed by a group control component as described with reference to FIGS. 12 through 15.

At 2220, the base station may communicate, to the UE, a data transmission in accordance with a first configured grant configuration of the set of configured grant configurations based on a configuration indication for the UE in the group DCI indicating the first configured grant configuration. The operations of 2220 may be performed according to the methods described herein. In some examples, aspects of the operations of 2220 may be performed by a data component as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a user equipment (UE), comprising:
   receiving control signaling that configures the UE with a plurality of configured grant configurations;
   receiving, via a group control channel, group downlink control information for a plurality of UEs that includes the UE;
   communicating a data transmission in accordance with a first configured grant configuration of the plurality of configured grant configurations based at least in part on a configuration indication in the group downlink control information indicating the first configured grant configuration; and
   wherein the group downlink control information indicates to release a first configured grant corresponding to the first configured grant configuration subsequent to communicating the data transmission.

2. The method of claim 1, wherein receiving the control signaling comprises:
   receiving the control signaling that indicates a group identifier assigned to the plurality of UEs, wherein the group downlink control information is received based at least in part on the group identifier.

3. The method of claim 1, wherein receiving the control signaling comprises:
   receiving the control signaling that indicates a payload size for the group downlink control information, wherein the group downlink control information is received based at least in part on the payload size.

4. The method of claim 1, wherein receiving the control signaling comprises:
   receiving the control signaling that indicates a serving cell identifier, wherein the data transmission is communicated on a carrier corresponding to the serving cell identifier.

5. The method of claim 1, wherein receiving the control signaling comprises:
   receiving the control signaling that indicates a starting position indicator, wherein the configuration indication is identified for the UE within the group downlink control information based at least in part on the starting position indicator.

6. The method of claim 1, wherein the configuration indication comprises an index corresponding to the first configured grant configuration.

7. The method of claim 1, wherein receiving the control signaling comprises:
   receiving the control signaling that indicates a transmit power control command, wherein the data transmission is transmitted based at least in part on the transmit power control command.

8. The method of claim 1, wherein receiving the control signaling comprises:
   receiving the control signaling that indicates a transmit power control command and the configuration indication comprises an index corresponding to the first configured grant configuration.

9. The method of claim 1, further comprising:
   identifying that a first configured grant activated by the first configured grant configuration is for an initial transmission or a retransmission.

10. The method of claim 1, wherein receiving the group downlink control information comprises:
    receiving the group downlink control information that comprises a status indication that indicates that a first configured grant activated by the first configured grant configuration is for an initial transmission or a retransmission.

11. The method of claim 1, further comprising:
    releasing a first dynamic grant or a first configured grant corresponding to the first configured grant configuration based at least in part on the data transmission being a retransmission.

12. The method of claim 1, further comprising:
    determining a feedback identifier corresponding to the data transmission that is a retransmission.

13. The method of claim 1, wherein a first configured grant corresponding to the first configured grant configuration remains active for one or more additional initial data transmissions until a release indicator is received.

14. The method of claim 1, wherein the group downlink control information activates a semi-persistent resource or an uplink configured grant resource for a single initial transmission.

15. The method of claim 1, further comprising:
receiving radio resource control signaling that indicates, for the UE, a first delay between reception of a downlink grant and a downlink data reception corresponding to the downlink grant, a second delay between the data reception and feedback transmission for the data reception, a third delay between reception of an uplink grant and an uplink data transmission corresponding to the uplink grant, or any combination thereof.

16. The method of claim 1, further comprising:
receiving downlink control information comprising a per UE bit field that indicates a first delay between reception of a downlink grant and a downlink data reception corresponding to the downlink grant, a second delay between the data reception and feedback transmission for the data reception, a third delay between reception of an uplink grant and an uplink data transmission corresponding to the uplink grant, or any combination thereof.

17. A method for wireless communications by a user equipment (UE), comprising:
receiving control signaling that configures the UE with a plurality of configured grant configurations;
receiving, via a group control channel, group downlink control information for a plurality of UEs that includes the UE;
communicating a data transmission in accordance with a first configured grant configuration of the plurality of configured grant configurations based at least in part on a configuration indication in the group downlink control information indicating the first configured grant configuration;
receiving control signaling that indicates the group downlink control information comprises a hybrid automatic repeat request (HARQ) field; and
determining that the group downlink control information activates a semi-persistent resource or an uplink configured grant resource for a single initial transmission based at least in part on the control signaling indicating that the group downlink control information comprises the HARQ field.

18. A method for wireless communications by a user equipment (UE), comprising:
receiving control signaling that configures the UE with a plurality of configured grant configurations;
receiving, via a group control channel, group downlink control information for a plurality of UEs that includes the UE;
communicating a data transmission in accordance with a first configured grant configuration of the plurality of configured grant configurations based at least in part on a configuration indication in the group downlink control information indicating the first configured grant configuration;
receiving control signaling that indicates the group downlink control information does not include a hybrid automatic repeat request (HARQ) field; and
determining that the group downlink control information activates a semi-persistent resource or an uplink configured grant resource for multiple transmissions based at least in part on the control signaling indicating that the group downlink control information does not include the HARQ field.

19. A method for wireless communications by a user equipment (UE), comprising:
receiving control signaling that configures the UE with a plurality of configured grant configurations;
receiving, via a group control channel, group downlink control information for a plurality of UEs that includes the UE;
communicating a data transmission in accordance with a first configured grant configuration of the plurality of configured grant configurations based at least in part on a configuration indication in the group downlink control information indicating the first configured grant configuration; and
receiving unicast downlink control information that deactivates a first configured grant corresponding to the first configured grant configuration subsequent to communicating the data transmission.

20. A method for wireless communications by a user equipment (UE), comprising:
receiving control signaling that configures the UE with a plurality of configured grant configurations;
receiving, via a group control channel, group downlink control information for a plurality of UEs that includes the UE;
communicating a data transmission in accordance with a first configured grant configuration of the plurality of configured grant configurations based at least in part on a configuration indication in the group downlink control information indicating the first configured grant configuration; and
receiving second group downlink control information that releases a first configured grant corresponding to the first configured grant configuration subsequent to communicating the data transmission.

21. A method for wireless communications by a user equipment (UE), comprising:
receiving control signaling that configures the UE with a plurality of configured grant configurations;
receiving, via a group control channel, group downlink control information for a plurality of UEs that includes the UE;
communicating a data transmission in accordance with a first configured grant configuration of the plurality of configured grant configurations based at least in part on a configuration indication in the group downlink control information indicating the first configured grant configuration;
receiving second group downlink control information that releases a semi-persistent resource corresponding to the first configured grant configuration; and
transmitting an acknowledgement for the second group downlink control information in a resource of the group control channel that is radio resource control configured for the UE or indicated by UE-specific downlink control information within the second group downlink control information.

22. A method for wireless communications by a user equipment (UE), comprising:
receiving control signaling that configures the UE with a plurality of configured grant configurations;
receiving, via a group control channel, group downlink control information for a plurality of UEs that includes the UE;
communicating a data transmission in accordance with a first configured grant configuration of the plurality of configured grant configurations based at least in part on a configuration indication in the group downlink control information indicating the first configured grant configuration; and information comprises:
receiving the group downlink control information that comprises an indication for the plurality of UEs indicating a first delay between reception of a downlink grant and a downlink data reception corresponding to the downlink grant, a second delay between the data reception and feedback transmission for the data reception, a third delay between reception of an uplink grant and an uplink data transmission corresponding to the uplink grant, or any combination thereof.

23. A method for wireless communications by a user equipment (UE), comprising:
receiving control signaling that configures the UE with a plurality of configured grant configurations;
receiving, via a group control channel, group downlink control information for a plurality of UEs that includes the UE;
communicating a data transmission in accordance with a first configured grant configuration of the plurality of configured grant configurations based at least in part on a configuration indication in the group downlink control information indicating the first configured grant configuration; and
receiving unicast downlink control information that comprises a first grant, the unicast downlink control information at least partially overlapping in time with the group downlink control information that comprises a second grant, wherein the data transmission is communicated in accordance with the first grant based at least in part on a number of symbols between a last symbol of a control channel that transports the unicast downlink control information and a first symbol indicated in the first grant or the second grant satisfies a threshold.

24. A method for wireless communications by a user equipment (UE), comprising:
receiving control signaling that configures the UE with a plurality of configured grant configurations;
receiving, via a group control channel, group downlink control information for a plurality of UEs that includes the UE;
communicating a data transmission in accordance with a first configured grant configuration of the plurality of configured grant configurations based at least in part on a configuration indication in the group downlink control information indicating the first configured grant configuration; and
receiving unicast downlink control information that comprises a first grant, the unicast downlink control information at least partially overlapping in time with the group downlink control information that comprises a second grant, wherein the data transmission is communicated in accordance with the first grant based at least in part on a last symbol of the group control channel that transports the group downlink control information ending after a last symbol of a second control channel that transports the unicast downlink control information.

25. A method for wireless communications by a user equipment (UE), comprising:
receiving control signaling that configures the UE with a plurality of configured grant configurations;
receiving, via a group control channel, group downlink control information for a plurality of UEs that includes the UE;
communicating a data transmission in accordance with a first configured grant configuration of the plurality of configured grant configurations based at least in part on a configuration indication in the group downlink control information indicating the first configured grant configuration;
receiving unicast downlink control information that comprises a first grant, the unicast downlink control information at least partially overlapping in time with the group downlink control information that comprises a second grant; and
identifying an error based at least in part on a number of symbols between a last symbol of a control channel that transports the unicast downlink control information and a first symbol indicated in the first grant, or the second grant not satisfying a threshold or based at least in part on a last symbol of the group control channel that transports the group downlink control information not ending after a last symbol of a second control channel that transports the unicast downlink control information, or both.

26. An apparatus for wireless communications, comprising:
a processor,
memory coupled with the processor; and
instructions stored in the memory and executable by the processor to cause the apparatus to:
receive control signaling that configures the apparatus with a plurality of configured grant configurations;
receive, via a group control channel, group downlink control information for a plurality of apparatuses that includes the apparatus;
communicate a data transmission in accordance with a first configured grant configuration of the plurality of configured grant configurations based at least in part on a configuration indication in the group downlink control information indicating the first configured grant configuration; and
wherein the group downlink control information indicates to release a first configured grant corresponding to the first configured grant configuration subsequent to communicating the data transmission.

* * * * *